(12) United States Patent
Nomura et al.

(10) Patent No.: US 7,487,163 B2
(45) Date of Patent: Feb. 3, 2009

(54) APPARATUS AND METHOD FOR BUSINESS PROCESS TRACKING AND BUSINESS PROCESS TRACKING PROGRAM, AND RECORDING MEDIUM THEREOF

(75) Inventors: Yoshihide Nomura, Kawasaki (JP); Koki Kato, Kawasaki (JP); Hirotaka Hara, Kawasaki (JP); Mimiko Hayashi, Kawasaki (JP); Hiroshi Kobayashi, Kawasaki (JP); Osamu Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 10/823,562

(22) Filed: Apr. 14, 2004

(65) Prior Publication Data
US 2005/0076059 A1   Apr. 7, 2005

(30) Foreign Application Priority Data
Oct. 3, 2003   (JP) .............................. 2003-346271

(51) Int. Cl.
*G06F 17/00* (2006.01)
*G06Q 30/00* (2006.01)

(52) U.S. Cl. .................... 707/100; 707/104.1; 705/1

(58) Field of Classification Search .................. 707/10, 707/100, 101, 200, 103 X, 103 Y, 103 Z, 707/103 R, 1, 2, 3, 102, 104.1; 705/1, 22, 705/20, 16, 26, 32
See application file for complete search history.

(56) References Cited

U.S. PATENT DOCUMENTS

| | | | |
|---|---|---|---|
| 6,141,699 A * | 10/2000 | Luzzi et al. ................. 719/331 |
| 6,763,346 B1 * | 7/2004 | Nishida et al. ................. 707/2 |
| 6,763,353 B2 * | 7/2004 | Li et al. ......................... 707/4 |
| 6,978,247 B1 * | 12/2005 | Bogart et al. .................. 705/8 |
| 7,113,959 B1 * | 9/2006 | Klatt et al. ............... 707/104.1 |
| 2002/0038217 A1 * | 3/2002 | Young .......................... 705/1 |
| 2002/0059274 A1 * | 5/2002 | Hartsell et al. ............. 707/100 |
| 2002/0111922 A1 * | 8/2002 | Young et al. ................. 705/80 |
| 2003/0014322 A1 * | 1/2003 | Kreidler et al. .............. 705/26 |
| 2003/0097345 A1 * | 5/2003 | Upton ........................ 705/401 |
| 2003/0154191 A1 * | 8/2003 | Fish et al. ..................... 707/2 |
| 2003/0163329 A1 * | 8/2003 | Bolene .......................... 705/1 |
| 2004/0139079 A1 * | 7/2004 | Eryurek et al. ............. 707/100 |
| 2004/0153329 A1 * | 8/2004 | Casati et al. ................... 705/1 |
| 2004/0237077 A1 * | 11/2004 | Cole et al. .................. 717/162 |
| 2004/0249644 A1 * | 12/2004 | Schiefer et al. ............... 705/1 |
| 2005/0138081 A1 * | 6/2005 | Alshab et al. .............. 707/200 |

FOREIGN PATENT DOCUMENTS

| | | |
|---|---|---|
| JP | 9-259181 | 10/1997 |
| JP | 10-063747 | 3/1998 |
| JP | 2001-134653 | 5/2001 |
| JP | 2002-203087 | 7/2002 |
| JP | 2003-16294 | 1/2003 |
| JP | 2003-271791 | 9/2003 |

* cited by examiner

*Primary Examiner*—Greta L Robinson
(74) *Attorney, Agent, or Firm*—Staas & Halsey LLP

(57) ABSTRACT

An event management apparatus collects event data which an event extraction unit of each business system extracts on the basis of event extraction definition, and performs queuing to an event queue. An event relation unit makes groups of event data in units of business data, and performs the relative processing of business data to store the event data in an event management DB. When retrieval conditions are inputted from a user terminal, the output unit retrieves the event management DB according to the retrieval conditions, and outputs and displays relation between business data on the user terminal in a tree form.

10 Claims, 37 Drawing Sheets

FIG. 5A

BUSINESS PROCESS

| ID | ACTIVITY |
|---|---|
| p1 | ORDER INTAKE |
| p2 | INVENTORY INQUIRY |
| p3 | ORDER PLACEMENT |
| p4 | ACCEPTANCE |
| p5 | SHIPMENT |
| p6 | DELIVERY |

FIG. 5B

BUSINESS DATA

| ID | BUSINESS DATA NAME |
|---|---|
| d1 | ORDER INTAKE |
| d2 | ORDER PLACEMENT |
| d3 | DELIVERY |

FIG. 6A

DATA ITEMS

| ID | NAME | TYPE | BUSINESS DATA |
|---|---|---|---|
| v1 | ORDER INTAKE ID | KEY | d1 |
| v2 | DATE OF DELIVERY | DATE | d1 |
| v3 | AMOUNT OF ORDERS RECEIVED | NUMERICAL VALUE | d1 |
| v4 | ORDER PLACEMENT ID | KEY | d2 |
| v5 | ORDER INTAKE ID | KEY | d2 |
| v6 | VENDOR | CHARACTER STRING | d2 |
| v7 | DELIVERY ID | KEY | d3 |
| v8 | ORDER PLACEMENT ID | KEY | d3 |
| v9 | DELIVERY DATE | DATE | d3 |

FIG. 6B

TRANSITION

| ID | INPUT/ OUTPUT | EFFECT | ACTIVITY | BUSINESS DATA |
|---|---|---|---|---|
| t1 | OUTPUT | C | p1 | d1 |
| t2 | INPUT | R | p2 | d1 |
| t3 | OUTPUT | C | p3 | d2 |
| t4 | INPUT | U | p4 | d2 |
| t5 | OUTPUT | C | p5 | d3 |
| t6 | INPUT | U | p6 | d3 |

FIG. 9

EVENT EXTRACTION DEFINITION                              320

```xml
<?xml version="1.0" encoding="Shift_JIS"?>
<extractDefinition>
<UMLmodel name="sample1"/>
<system name="myR3" type="R/3">
<location name="userexit_jutyuu_enter" activityName="ORDER INTAKE" modelOutput="yes"> <!--ACTIVITY START-->
<startTime /> <!-- tempTable,|DateTime USE THE DATATIME FIELD OF THE TEMPTABLE -->
<primaryKey name="ORDER INTAKE" place="AA-BB" />
</location>
<location name="userexit_jutyuu_exit" activityName="ORDER INTAKE" modelOutput="no"> <!--ACTIVITY END-->
<finishTime />
<primaryKey name="ORDER INTAKE" place="AA-BB" />
<property name="AMOUNT OF ORDERS RECEIVED" place="AB-CD" />
<property name="REQUESTED DELIVERY DATE" place="XX-YY" />
</location>
<temporaryTable> <!-- for JMS publisher -->
<name>tempTable</name> <!-- default: "tempTable" -->
<jdbc user="ana" password="ana" url="jdbc:oracle:thin:@localhost:1521:HESTER"
    driver="oracle.jdbc.driver.OracleDriver" />
</temporaryTable>
</system>
..
</extractDefinition>
```

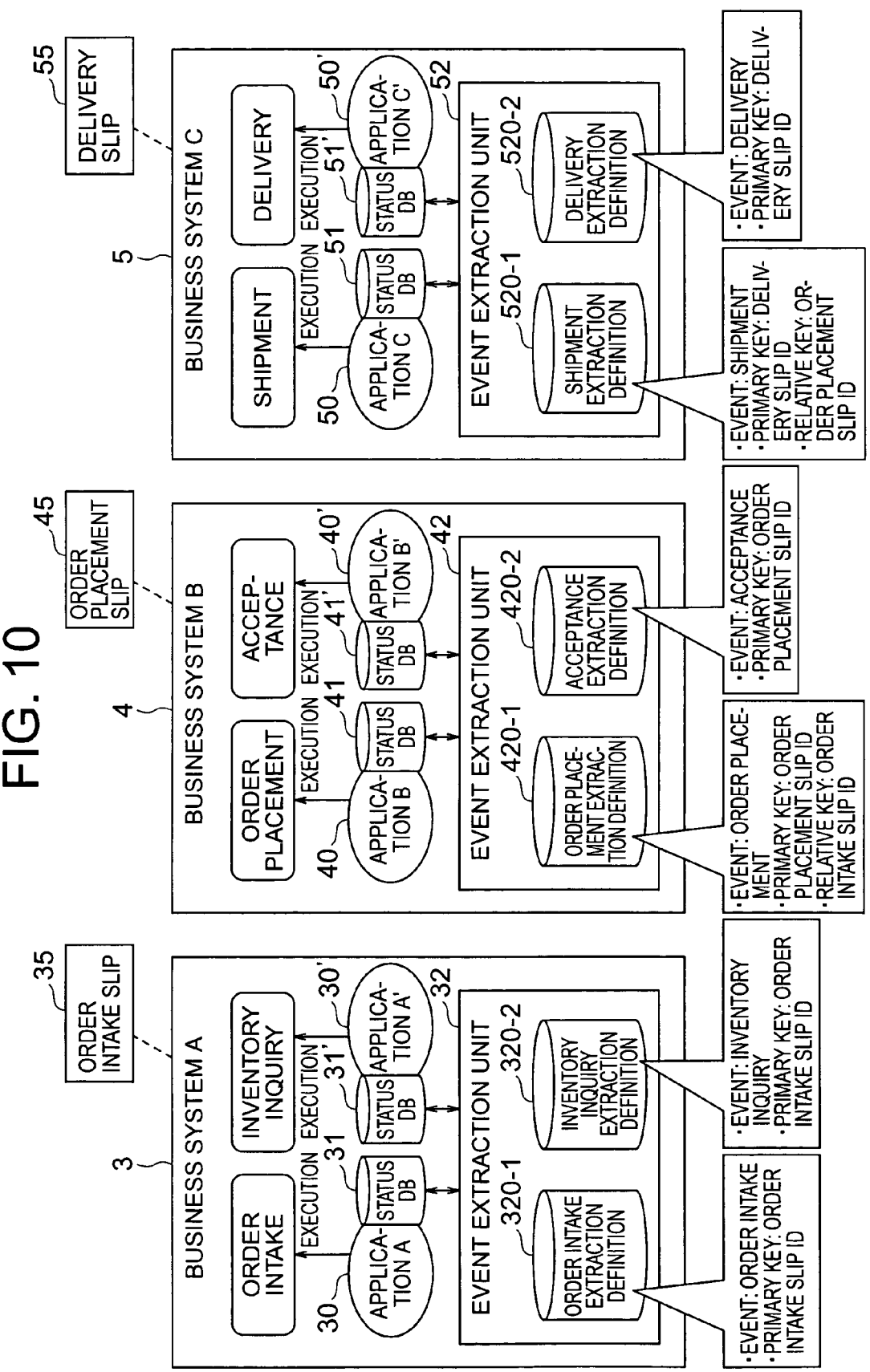

FIG. 11A

```
                    ORDER INTAKE EVENT DATA
<bpm:event xmlns:bpm="urn:fj-bpm-event">
 <bpm:modelName>PRODUCT PROCESS</bpm:modelName>
<bpm:eventData>
  <bpm:eventName>ORDER INTAKE</bpm:eventName>
   <bpm:startTime>20030605T103500</bpm:startTime>
</bpm:eventData>
   <bpm:primaryKey type="ORDER INTAKE SLIP">,o001</bpm:primaryKey>
   <bpm:property name="AMOUNT OF ORDERS RECEIVED">1000</bpm:property>
   <bpm:property name="REQUESTED DELIVERY DATE">2003/6/20</bpm:property>
</bpm:event>
```

FIG. 11B

```
                  ORDER PLACEMENT EVENT DATA
<bpm:event xmlns:bpm="urn:fj-bpm-event">
 <bpm:modelName>PRODUCT PROCESS</bpm:modelName>
<bpm:eventData>
  <bpm:eventName>ORDER PLACEMENT</bpm:eventName>
   <bpm:startTime>20030605T103500</bpm:startTime>
</bpm:eventData>
   <bpm:primaryKey type="ORDER PLACEMENT SLIP>p101</bpm:primaryKey>
   <bpm:relativeKey type="ORDER INTAKE SLIP>o001</bpm:relativeKey>
   <bpm:property name="PRODUCTION NUMBER">12345</bpm:property>
   <bpm:property name="QUANTITY">100</bpm:property>
   <bpm:property name="UNIT PRICE">1000</bpm:property>
</bpm:event>
```

FIG. 13

SVG FILE FOR FLOW EXPRESSION

```
<?xml version="1.0" encoding="UTF-8"?>
<svg xmlns:bpm="urn:fujitsu-bpm" id="bpm" width="1333" height="1000">
<defs>
  <marker id="arrowhead" viewBox="0 0 10 10" refX="10" refY="5" markerUnits="strokeWidth" markerWidth="4" markerHeight="3" orient="auto">
    <path d="M 0 0 L 10 5 L 0 10 z" />
  </marker>
</defs>
<g>
<circle bpm:id="z+wPK9HWsk6anJ9hz5R7zg" cx="143" cy="51" r="10" style="fill:#6FC498" stroke="#666666" stroke-width="2" />
<text bpm:id="z+wPK9HWsk6anJ9hz5R7zg" bpm:text="1" x="168" y="53"></text>
</g>
<g>
<rect bpm:id="ORDER INTAKE" x="91" y="104" width="100" height="40" style="fill:#CDCDCD" stroke="none" />
<text bpm:id="ORDER INTAKE" x="141" y="132" text-anchor="middle">ORDER INTAKE</text>
<text bpm:id="ORDER INTAKE" bpm:text="0" x="141" y="144" text-anchor="middle"></text>
<text bpm:id="ORDER INTAKE" bpm:text="1" x="193" y="147"></text>
<text bpm:id="ORDER INTAKE" bpm:text="2" x="193" y="126"></text>
<text bpm:id="ORDER INTAKE" bpm:text="3" x="193" y="106"></text>
<rect bpm:id="ORDER INTAKE" x="91" y="104" width="100" height="16" style="fill:#808285" stroke="none" />
<text bpm:id="ORDER INTAKE" x="141" y="116" fill="white" text-anchor="middle"><<SALES>></text>
</g>
..
</svg>
```

FORM IN WHICH AN IDENTIFICATION ID IS EMBEDDED IN VECTOR DATA

FIG. 16A

EVENT DATA: ORDER PLACEMENT

```
<bpm:event xmlns:bpm="urn:fj-bpm-event">
 <bpm:modelName>PRODUCT PROCESS</bpm:modelName>
 <bpm:eventData>
  <bpm:eventName>ORDER PLACEMENT</bpm:eventName>
  <bpm:startTime>20030827T1000</bpm:startTime>
 </bpm:eventData>
  <bpm:primaryKey type="ORDER PLACEMENT SLIP">p101</bpm:primaryKey>
  <bpm:relativeKey type="ORDER INTAKE SLIP">o001</bpm:relativeKey>
  <bpm:property name="UNIT PRICE">1000</bpm:property>
</bpm:event>
```

FIG. 16B

PRIMARY BUSINESS DATA: ORDER PLACEMENT SLIP

```
<bpm:businessData xmlns:bpm="urn:fj-bpm-event">
 <bpm:modelName>PRODUCT PROCESS</bpm:modelName>
 <bpm:primaryKey type="ORDER PLACEMENT SLIP">p101</bpm:primaryKey>
 <bpm:relativeKey type="ORDER INTAKE SLIP">o001</bpm:relativeKey>
 <bpm:eventData>
  <bpm:eventName>ORDER PLACEMENT</bpm:eventName>
  <bpm:startTime>20030827T1000</bpm:startTime>
 </bpm:eventData>
 <bpm:property name="UNIT PRICE">1000</bpm:property>
</bpm:businessData>
```

FIG. 16C

RELATIVE BUSINESS DATA: ORDER INTAKE SLIP

```
<bpm:businessData xmlns:bpm="urn:fj-bpm-event">
 <bpm:modelName>PRODUCT PROCESS</bpm:modelName>
 <bpm:primaryKey type="ORDER INTAKE SLIP">o001</bpm:primaryKey>
 <bpm:relativeKey type="ORDER PLACEMENT SLIP">p101</bpm:relativeKey>
</bpm:businessData>
```

FIG. 28

INPUT OF RETRIEVAL CONDITION --- BUSINESS PROCESS TRACKING

BUSINESS PROCESS: SAMPLE1 ▶
RETRIEVAL OBJECT: DELIVERY ▶
RETRIEVAL ITEM 1: SLIP NUMBER ▶ VALUE:
RETRIEVAL ITEM 2: SELECT AN ITEM ▶ VALUE:
RETRIEVAL ITEM 3: SELECT AN ITEM ▶ VALUE:
RETRIEVAL RANGE: 2003 ▶ YEAR 1 ▶ MONTH 1 ▶ DAY ~ 2003 ▶ YEAR 10 ▶ MONTH 1 ▶ DAY

RESULT DISPLAY METHOD: ⊙ DISPLAY BY EVENT EXPLORER  ○ DISPLAY BY LIST

[RETRIEVAL EXECUTION]  [CLEAR]  [RETURN]  [HELP]

FIG. 29

INPUT OF RETRIEVAL --- BUSINESS PROCESS TRACKING
CONDITION

BUSINESS
PROCESS: [PRODUCTION AND SALES ▶]
RETRIEVAL
OBJECT: [ORDER INTAKE ▶]
RETRIEVAL
ITEM 1: [SELECT AN ITEM ▶]  VALUE: [        ]
RETRIEVAL
ITEM 2: [SELECT AN ITEM ▶]  VALUE: [        ]
RETRIEVAL
ITEM 3: [SELECT AN ITEM ▶]  VALUE: [        ]
RETRIEVAL
RANGE: [2003 ▶] YEAR [1 ▶] MONTH [1 ▶] DAY ~ [2003 ▶] YEAR [1 ▶] MONTH [1 ▶] DAY

RESULT DISPLAY    DISPLAY BY          DISPLAY BY LIST
METHOD:        ○ EVENT EXPLORER  ⊙

[RETRIEVAL ]  [ CLEAR ]  [ RETURN ]  [ HELP ]
[EXECUTION]

FIG. 30

RETRIEVAL OF SLIP

RETRIEVAL CONDITION

PROCESS: PRODUCT SALES

RETRIEVAL OBJECT: ORDER INTAKE

RETRIEVAL RANGE: JANUARY 1, 2003 TO JANUARY 1, 2003

RETRIEVAL RESULT

SLIP NUMBER: o002

SLIP NUMBER: o001

SLIP NUMBER: o011

INPUT OF RETRIEV-
AL CONDITION

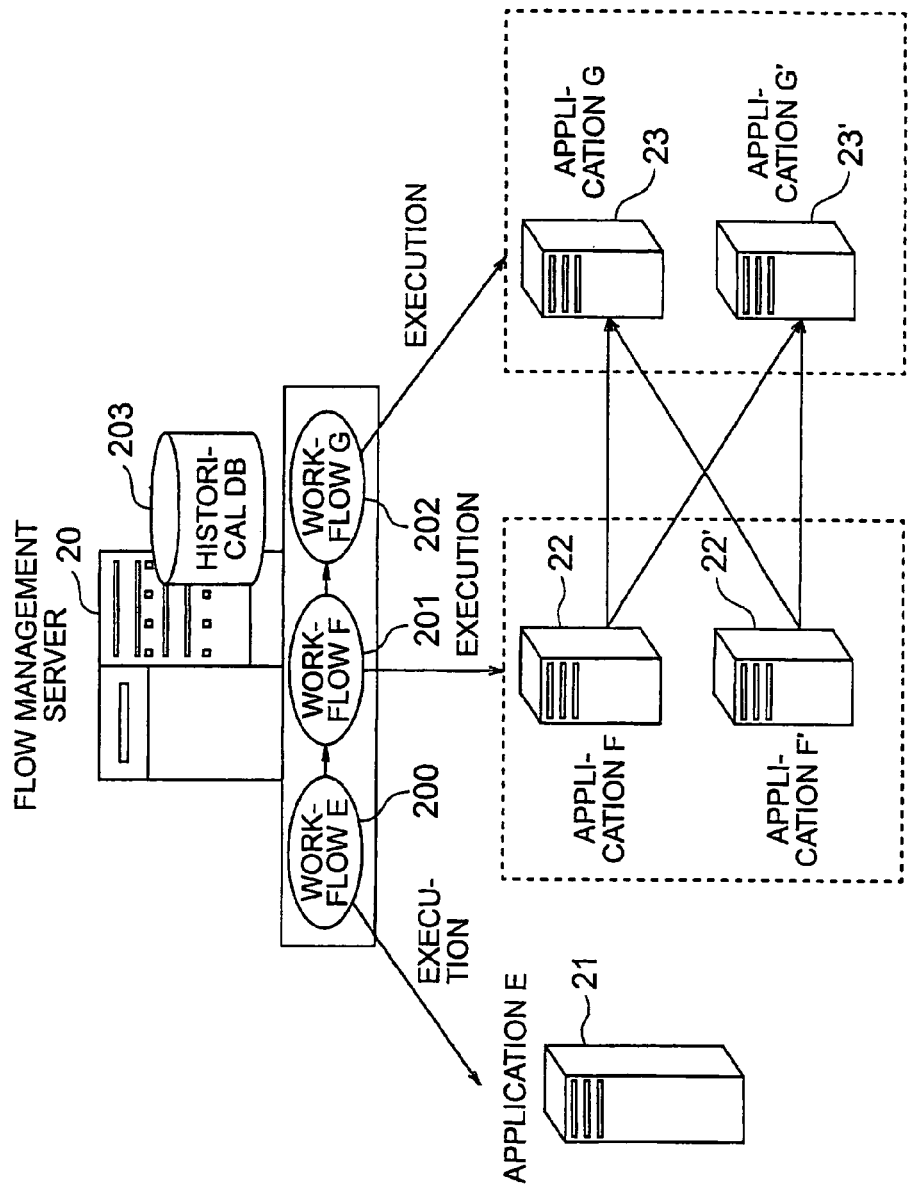

APPARATUS AND METHOD FOR BUSINESS PROCESS TRACKING AND BUSINESS PROCESS TRACKING PROGRAM, AND RECORDING MEDIUM THEREOF

BACKGROUND OF THE INVENTION

1. Field of the Invention

This invention relates to an apparatus and method for a business process tracking, a business process tracking program and a recording medium thereof, and more particularly to an apparatus and method for a business process tracking, a business process tracking program and a recording medium thereof, which use business process tracking technology that tracks a business process that flows among a plurality of business systems, and which make groups of event information extracted from each business system in units of business data, manages the business data with relating each other, and tracks business process on the basis of retrieval conditions inputted.

2. Description of the Related Art

When improving an existing business under operation, an analysis of the business process between business systems is conducted to determine where a problem is and how to improve it. There is a workflow system as a system which watches how a business flows between business systems. Generally, a workflow system has meaning of a system which is provided with an existing flow engine and is provided with an application program (hereinafter, simply called "application") which performs automatic execution of a system in order of following a defined flow.

FIG. 37 is a diagram showing the outline of a conventional common workflow system. FIG. 37 shows a flow management server 20, an application E 21, an application F 22, an application G 23, and an application H 24. The applications E to H or 21 to 24 are located in different systems, respectively. FIG. 37 further shows a workflow E 200, a workflow F 201, a workflow G 202, and a historical database (DB) 203 in the flow management server 20 which manages the execution history of the applications E to G or 21 to 23.

Furthermore, FIG. 37 shows a status DB 210 of managing the status of the application E 21, a status DB 220 of managing the status of the application F 22, a status DB 230 of managing the status of the application G 23, and a status DB 240 of managing the status of the application H 24.

In addition, the application E 21, application F 22 and application G 23 are called from and executed in the workflow E 200, workflow F 201 and workflow G 202, respectively. On the other hand, it is assumed that the application H 24 has not such an execute form that it is called and executed from either of the above mentioned workflows.

In the workflow system shown in FIG. 37, with defining that businesses between different systems flow in order of the workflow E 200, workflow F 201, and workflow G 202, the flow management server 20 manages the execution history of an application corresponding to each workflow. That is, the flow management server 20 executes the application E 21 corresponding to the workflow E 200, executes the application F 22 corresponding to the workflow F 201 after the execution end of the application E 21, and executes the application G 23 corresponding to the workflow G 202 after the execution end of the application F 22.

In addition, Japanese Patent Application laid-Open No. 10(1998)-63747 (patent document #1) shows a workflow support system and method for making it possible to refer to or follow the history and the management information of progress with regard to a workflow or a typical business that is executed with spreading across different systems.

However, the workflow system shown in FIG. 37 has the structure of sequentially executing each application consistently and the flow management server 20 manages only the execution history of each application. Accordingly, it is difficult to grasp the status of each application. For this reason, for example, in order to meet a request that the flow management server 20 should manage various businesses in an application E 21, it is necessary to modify the application E 21 for subdivision of the internal processing of the application E 21, and to modify such that the subdivided processings are called from the flow management server 20 to execute them.

In addition, for example, the application H 24 is not made to be called and executed by either of the workflows E to G or 200 to 202. Accordingly, the flow management server 20 cannot grasp the status of the application H 24. Then, in order to grasp the status of the application H 24, it is necessary to modify the structure of the application H 24 such that the application H 24 has a form in which the application H 24 is called from and executed by a workflow.

Furthermore, in the present workflow system, as shown in FIG. 38, there is a problem that it is not possible to grasp the relation between applications which branch into a plurality of paths on the way. In FIG. 38, for example, the workflow F 201 makes the application F 22 and application F' 22' execute a plurality of processing in relation to the workflow E 200 separately. In addition, the workflow G 202 makes the application G 23 and application G' 23' execute a plurality of processing in relation to the workflow F 201 separately. It is assumed that the data of the application F 22 and the data of the application F' 22' is made to be passed to both of the application G 23 and application G' 23'.

A conventional common workflow system cannot grasp the relation between the application F 22 or F' 22' and the application G 23 or G' 23'. For this reason, to grasp the relation between applications which branch into a plurality of paths on the way, it is necessary to review a business process and an analysis method such as dividing the business process into a plurality of processes, and analyzing them separately.

In addition, the above mentioned patent document #1 does not disclose the technology in which the tracking result of the flow of a business between business systems is displayed in a flow form.

In particular, plenty of existing business systems is not necessarily executing transactions according to a workflow under a flow engine such as the flow management server 20. When the flow management server 20 does not exist, data such as processed data and unprocessed data must be collected by accessing each business system and analyzed to track the flow of the business. Accordingly, actually, it is impossible to track the flow of the business.

SUMMARY OF THE INVENTION

It is an object of the present invention to solve the above mentioned problems of the prior art, and to provide a business process tracking apparatus that makes it possible to track the flow of a business process which comprises a plurality of applications that are executed with spreading across different business systems without converting the existing system.

It is another object of the present invention to provide a business process tracking method that makes it possible to track the flow of a business process which comprises a plurality of applications that are executed with spreading across different business systems without converting the existing system.

It is still another object of the present invention to provide a business process tracking program that makes it possible to track the flow of a business process which comprises a plurality of applications that are executed with spreading across different business systems without converting the existing system.

It is further object of the present invention to provide a recording medium recording a business process tracking program that makes it possible to track the flow of a business process which comprises a plurality of applications that are executed with spreading across different business systems without converting the existing system.

In order to solve the above mentioned issues, the present invention executes the following processing.

(1) Event data, which is information showing a running status of each of applications located at different business systems, is collected by a method which is suitable to each application and is queued in an event queue.

Here, an event is data which shows that a certain business is executed within a business system and includes start and finish time of the business, and relative properties. Event data is extracted by an application for event data extraction provided at each business system according to the event extraction definition allocated at each business system. The extracted event information is converted into a common extensible markup language (XML) form within each business system, and a queuing is performed to the event queue of the event management apparatus which manages event data. Java message service (JMS) or the like is used for this queuing.

(2) In the event management apparatus, event information queued in the event queue is grouped at every business data, and is stored in an event management database (DB) making relation between the business data. Here, business data is the data shared between businesses in a certain considerable unit.

(3) Focusing of the business data is performed on the basis of retrieval conditions inputted (for example, an event generation term, a related property, etc.).

(4) The data relative to the business data focused is developed in a tree and displayed, and tracking of the processing is performed based from voluntary data.

(5) The event relative to the business data developed in the tree is retrieved, and the business relative to this event is illustrated by a tracking view, and the execution situation of the flow of the present business is displayed. Here, tracking has a meaning of a method of verifying which businesses are executed among business processes which are the flow of the whole business that is executed with spreading across the business systems defined beforehand, and which businesses are not executed.

That is, a business process tracking apparatus of the present invention tracks a business process which is the flow of businesses that is executed with spreading across different business systems. The business process tracking apparatus comprises means for storing business data, treated in a business in each business system, and business process definition information defining relative information between respective business data, event data collection means for collecting event data which is the information of showing an execution status of an application which executes each of businesses extracted in the above mentioned business system, event relation means for grouping the above mentioned collected event data in units of business data on the basis of the above mentioned business process definition information and relating business data collected (or acquired) as event data, event management data storage means for storing the relative business data, and output means for outputting the relation between business data in a tree form by retrieving the above mentioned event management data storage means on the basis of inputted retrieval conditions.

In addition, the above mentioned output means further comprises means for displaying an event relative to a business data selected on the above mentioned outputted tree of business data on a business process chart produced on the basis of the above mentioned business process definition information.

A computer and a software program can achieve each of the above processing means, and it is also possible to record the program on a computer-readable recording medium and to provide it, and also to provide it through a network.

According to the present invention, it is possible to track the flow of the business process, which comprises a plurality of applications executed with spreading across different business systems, without converting the existing system. In particular, according to the present invention, it is possible to grasp the status of each application, and also to grasp the status of an application which is free from flow management. In addition, according to the present invention, it is possible to grasp the relation between applications which branch to a plurality of paths.

BRIEF DESCRIPTION OF THE DRAWINGS

FIGS. 5A, 5B, 6A and 6B show the data configuration of definition data stored in a business process DB.

FIG. 9 shows an exemplary event extraction definition.

FIG. 10 is a diagram showing a configurational example according to an event extraction definition.

FIGS. 11A and 11B show exemplary event data.

FIG. 13 shows an example of an SVG file for a flow expression.

FIGS. 16A, 16B, and 16C show event data, an order placement slip and an order intake slip.

FIGS. 28 and 29 show exemplary retrieval condition input screens of business data.

FIG. 30 shows an exemplary display of retrieval result.

FIG. 38 shows an example of a conventional common workflow system.

DETAILED DESCRIPTION OF THE PREFERRED EMBODIMENTS

Figure 1:
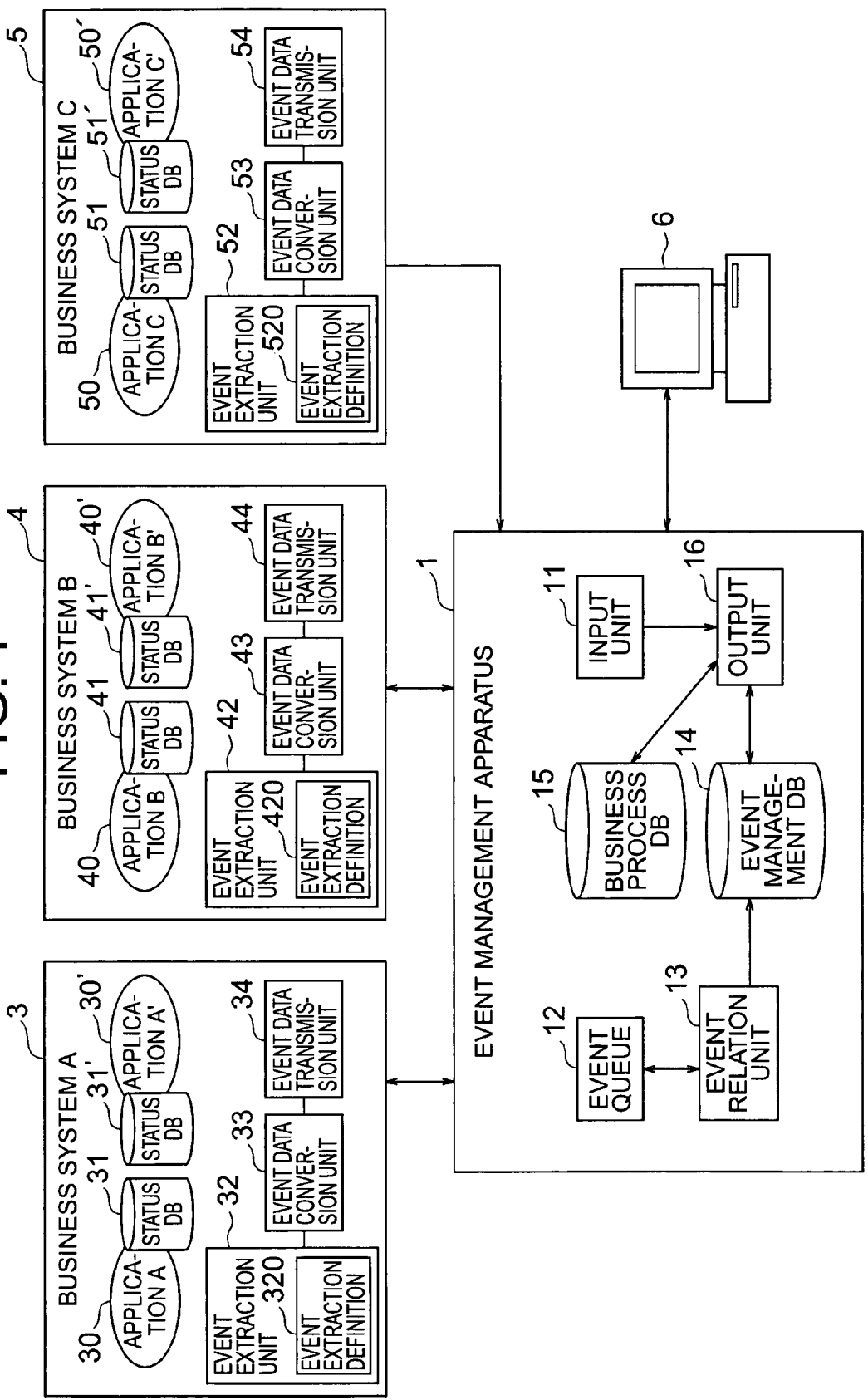
FIG. 1 is a diagram showing a configuration example of a system according to the present invention.

FIG. 1 is a diagram showing a configuration example of a system according to the present invention. FIG. 1 shows an event management apparatus 1 which collects and manages event data, a business system A 3, a business system B 4, a business system C 5, and a user terminal 6.

The event management apparatus 1 includes an input unit 11 which inputs retrieval conditions of event data, an event queue 12 in which event data transmitted from the business system A, B and C, or 3, 4 and 5 is queued, an event relation unit 13 which makes groups of event data in the event queue 12 in units of business data and relates business data, an event management DB 14 in which relative business data is stored, a business process DB 15 in which business process definition information and business data definition information is stored, and an output unit 16 which outputs the retrieval result of the event management DB 14 on the basis of the retrieval conditions inputted from the user terminal 6.

A business process has the meaning of flow of the whole business that is executed with spreading across business systems. Hereinafter, a business process will be explained as what comprises businesses such as order intake, inventory inquiry, order placement, acceptance, shipment, and delivery. In addition, business data, as described above, has the meaning of data shared among businesses in a certain considerable unit. Business data is stored in a form of a slip in each business within the event management DB 14.

The business system A 3 includes an application A 30 and an application A' 30' which execute businesses within the business system A 3 respectively, a status DB 31 of storing the status of the application A 30, a status DB 31' of storing the status of the application A' 30', an event extraction unit 32 which extracts event data from the status DB 31 and status DB 31', an event data conversion unit 33 which converts extracted event data into an XML format, for example, an event data transmission unit 34 which transmits converted event data to the event management apparatus 1, and data 320 of an event extraction definition defining which data item in the business system A 3 is extracted (hereinafter, an event extraction definition).

The business system B 4 includes an application B 40 and an application B' 40' which execute businesses within the business system B 4 respectively, a status DB 41 of storing the status of the application B 40, a status DB 41' of storing the status of the application B' 40', an event extraction unit 42 which extracts event data from the status DB 41 and status DB 41', an event data conversion unit 43 which converts extracted event data into an XML format, for example, an event data transmission unit 44 which transmits converted event data to the event management apparatus 1, and an event extraction definition 420 defining which data item in the business system B 4 is extracted.

The business system C 5 includes an application C 50 and an application C' 50' which execute businesses within the business system C 5 respectively, a status DB 51 of storing the status of the application C 50, a status DB 51' of storing the status of the application C' 50', an event extraction unit 52 which extracts event data from the status DB 51 and status DB 51', an event data conversion unit 53 which converts extracted event data into an XML format, for example, an event data transmission unit 54 which transmits converted event data to the event management apparatus 1, and an event extraction definition 520 defining which data item in the business system C 5 is extracted.

Event data queued in the event queue 12 of the event management apparatus 1 comprises, for example, an event type showing a type of an event, a primary key which is an identifier of the data with which the event belongs, a relative key which is an identifier of data which an event of a business relative to a business corresponding to a primary key belongs, and property data such as a serial number, quantity, and unit price.

Figure 2:
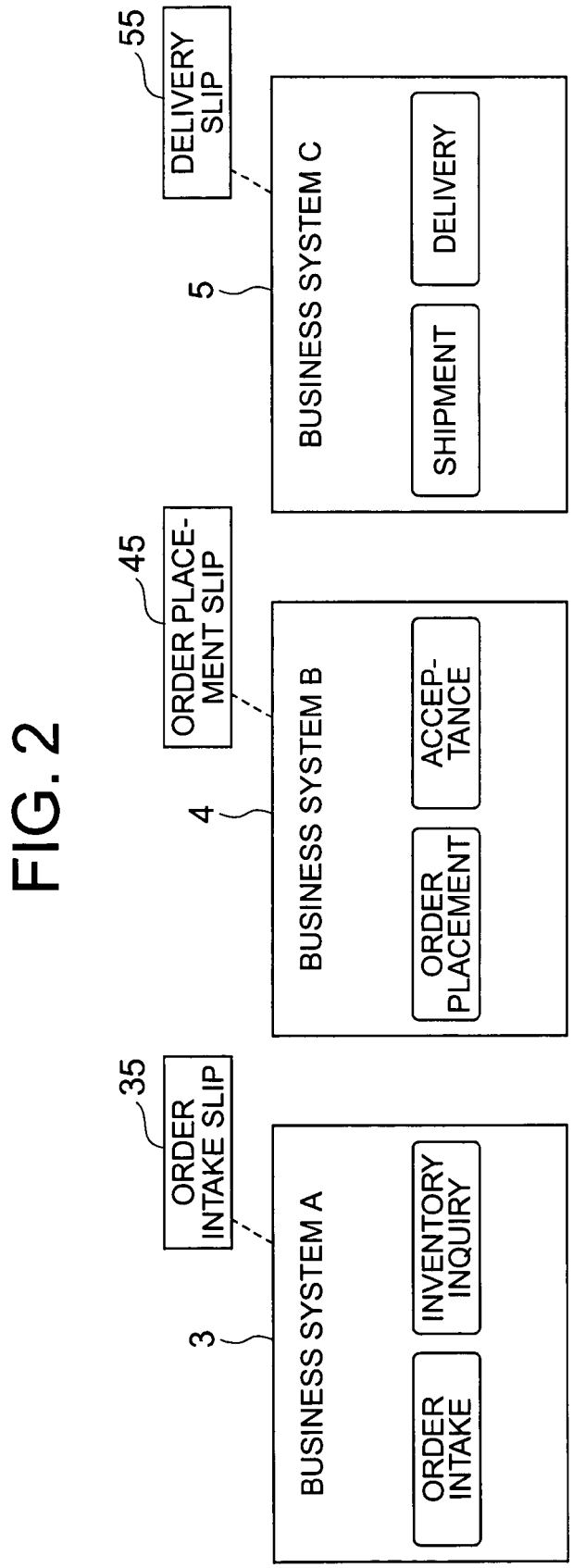
FIG. 2 is a diagram showing the example of arrangement of business systems.

The business system A 3 to business system C 5 are located as shown in FIG. 2. The business system A 3 executes, for example, the business of order intake and inventory inquiry, and treats order intake slips 35. The business system B 4 executes, for example, the business of order placement and acceptance, and treats order placement slips 45. The business system C 5 executes, for example, the business of shipment and delivery, and treats delivery slips 55.

As the preparation of business process tracking according to the present invention, it is necessary to input definition information of business processes and business data which are stored in the business process DB 15 and to input event extraction definitions 320 to 520 which are set in the event extraction units 32 to 52 of respective business systems A to C. An input method of such definition information will be explained.

Figure 3:
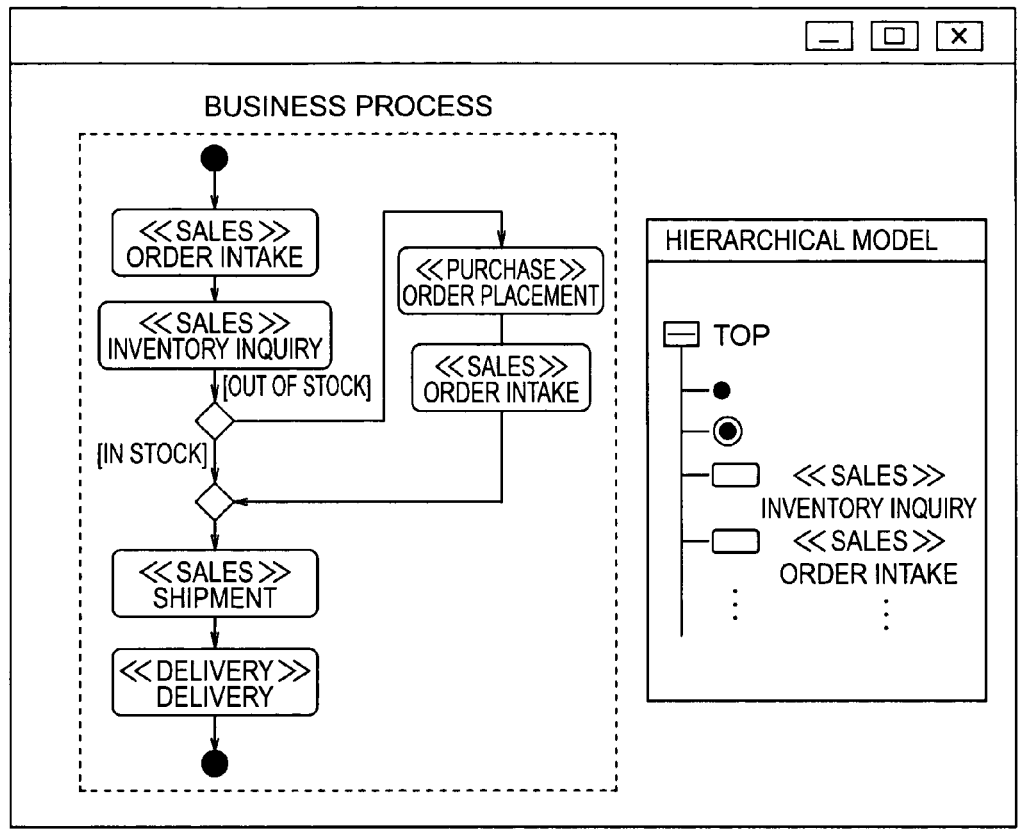
FIGS. 3 and 4 are exemplary input screen of definition data stored in a business process DB.
Figure 4:
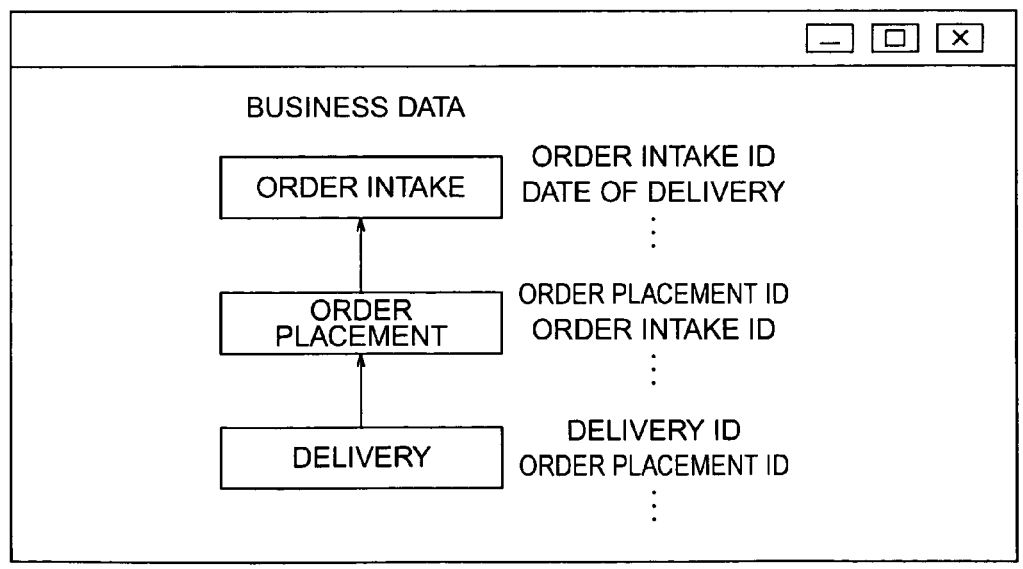

FIGS. 3 and 4 show input screens of definition data stored in the business process DB 15. For example, a business process as shown in a portion enclosed by dotted lines in FIG. 3 is drawn by using a graphical user interface (GUI) of a toolbox (not shown) prepared beforehand. Then, definition data on the business process is generated and stored in the business process DB 15. On the input screen shown in FIG. 3, for example, the following is defined. That is, "<<sales>> inventory inquiry" is executes after <<sales>> order intake> as activities. Then, when it is out of stock, activities of "<<purchase>> order placement" and "<<purchase>> acceptance" are executed, and when it is in stock, activities of "<<sales>> shipment" and "<<delivery>> delivery" are executed.

In addition, on the input screen shown in FIG. 4, by drawing business data "order intake", "order placement", and "delivery" and the relation between them, each business data is generated and stored in the business process DB 15. On the input screen shown in FIG. 4, for example, the following is defined. That is, there is data such as an "order intake ID" and a "delivery date" as property data of business data "order intake". There is data such as an "order placement ID" and an "order intake ID" as property data of business data "order placement". And, there is data such as an "delivery ID" and an "order placement ID" as property data of business data "delivery." Thus, the relation between business data is realized by having IDs of other businesses data in business data.

On the basis of definition information inputted from the input screens in FIGS. 3 and 4, definition data as shown in FIGS. 5A, 5B, 6A, and 6B is generated automatically. In this example, the definition data of a business process is generated and is managed as a table of a relational database. FIGS. 5A, 5B, 6A, and 6B are tables showing data configuration of definition data stored in the business process DB 15.

FIG. 5A shows an example of a table of activities which are respective businesses that constitute a business process. As shown in FIG. 5A, it is defined that the business process comprises activities such as order intake, inventory inquiry, order placement, acceptance, shipment, and delivery, for example. And, each activity is given an ID which uniquely specifies it. In addition, FIG. 5B shows an example of a table of business data. For example, in the table of business data, it is defined that there are order intake, order placement, and delivery as business data. And, an ID which uniquely specifies each business data is defined for each business data.

FIG. 6A is a list showing property data in business data. For example, the following is defined. That is, the property data of business data (ID=d1) called order intake includes an order intake ID, a delivery date and an amount of orders received. The property data of business data (ID=d2) called order placement includes an order placement ID, an order intake ID and a vendor. And, the property data of business data (ID=d3) called delivery is a delivery ID, an order placement ID and a delivery date.

As mentioned above, for example, the order -intake ID is defined as the property data of business data called order placement, and the order placement ID is defined as the property data of business data called delivery. Due to these definitions, the order placement has the relation to the order intake, and the delivery has the relation to the order placement. This corresponds to the relation between respective business data, that is, "delivery" to "order placement" to "order intake" drawn in FIG. 4.

FIG. 6B shows a correspondence table between activities and business data. This correspondence table comprises items of ID, Input/Output, Effect, Activity, and Business Data. "C" in the Effect item stands for Create, "R" stands for Read, and "U" stands for Update.

For example, this correspondence table shows the following. With looking at a first line of, business data called order intake is outputted from an activity called order intake, and it turns out that its transition ID is t1. In a second line, business data called order intake is inputted into an activity called inventory inquiry, and it turns out that its transition ID is t2. In a third line, business data called order placement is outputted from an activity called order placement, and it turns out that its transition ID is t3. In a fourth line, business data called order placement is inputted into an activity called acceptance, and it turns out that its transition ID is t4. In a fifth line, business data called delivery is outputted from an activity called shipment, and it turns out that its transition ID is t5. In a sixth line, business data called delivery is inputted into an activity called delivery, and it turns out that its transition ID is t6.

Figure 7A:
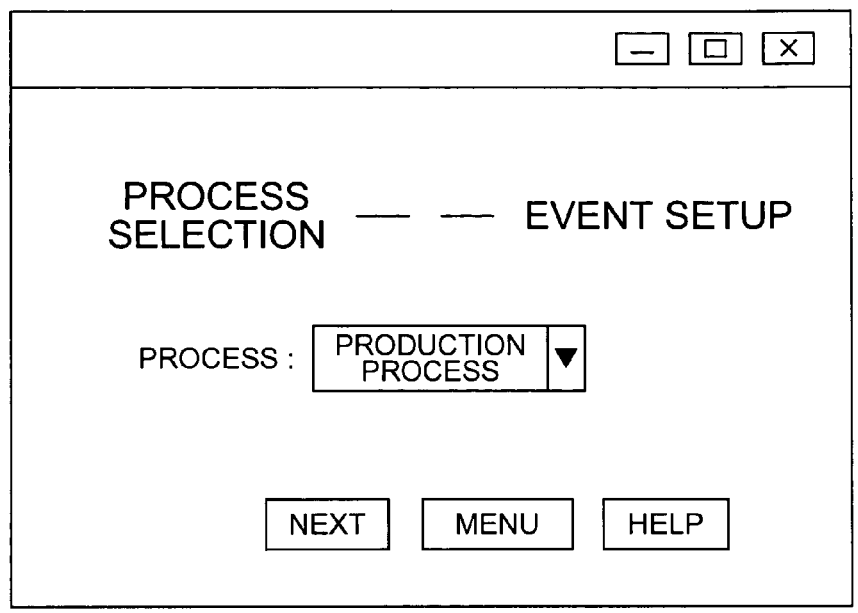
FIGS. 7A, 7B, 8A and 8B show exemplary event extraction definition screens.

The event extraction definition of what kind of event is monitored and extracted in each business system is inputted after the definition of the business process explained in FIGS. 3 to 6. FIGS. 7A, 7B, 8A, and 8B show exemplary event extraction definition screens for generating the event extraction definition in each business system. FIG. 7A shows a business process selection screen.

Figure 7B:
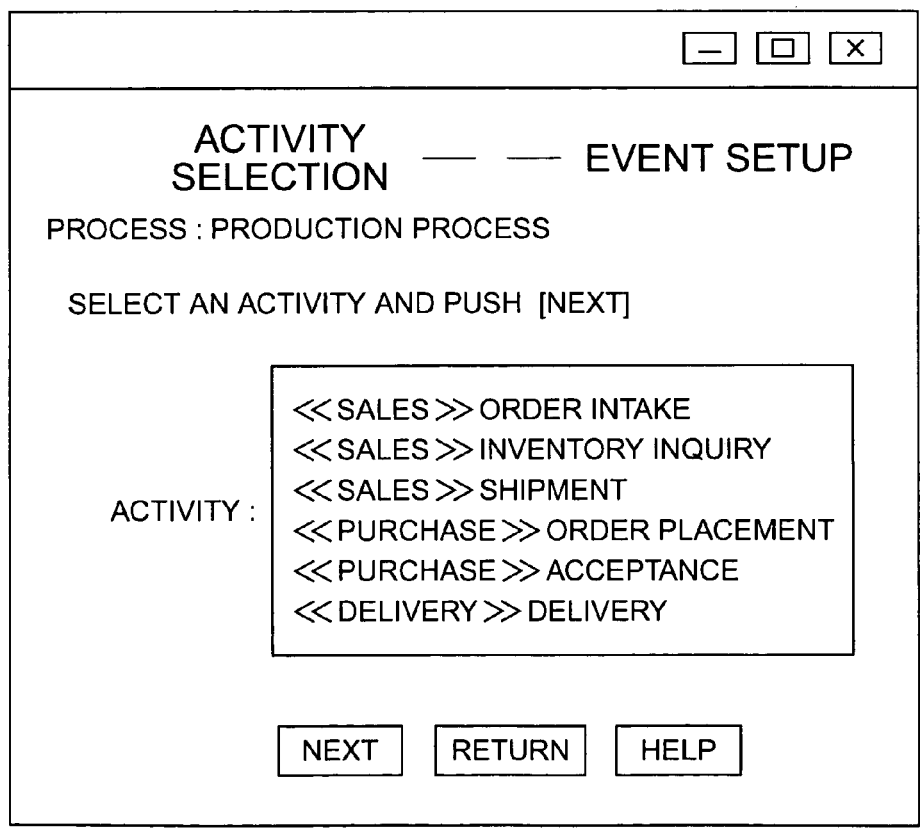
Figure 8A:
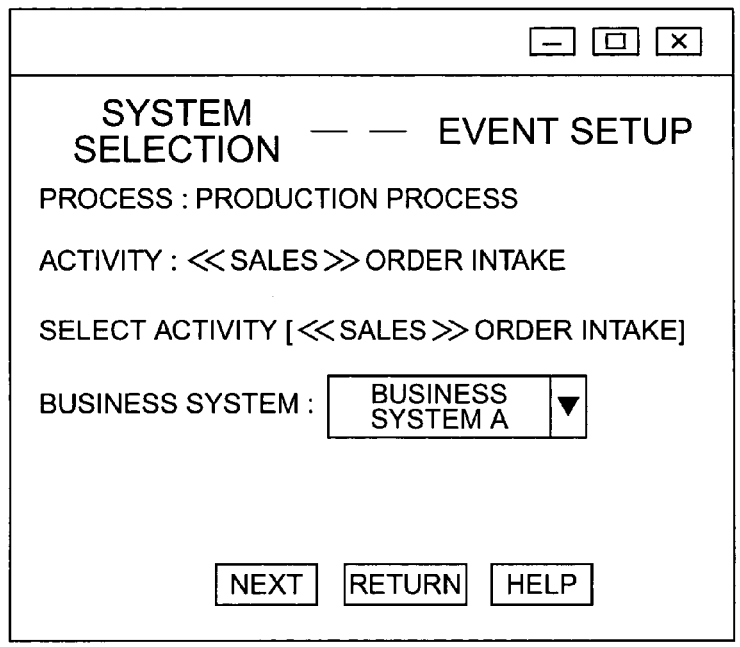

When a production process is selected as a process item in FIG. 7A and a "next" button is pushed, an activity selection screen is displayed as shown in FIG. 7B. In this activity selection screen, when "<<sales>> order intake" is selected as an activity and the "next" button is pushed, a selection screen of the business system which executes the activity "<<sales>> order intake" is displayed as shown in FIG. 8A.

Figure 8B:
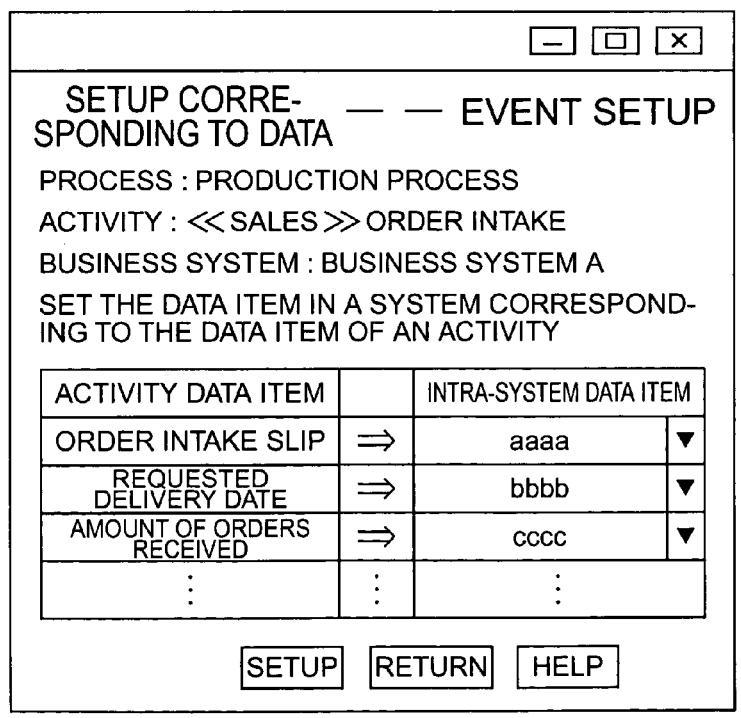

When "business system A" is selected as a business system and the "next" button is pushed, as shown in FIG. 8B, the selection screen of a data item in the business system A 3, which corresponds to the data item of the selected activity, is displayed. When a data item in the system is selected according to the selection screen shown in FIG. 8B and the "setup" button are pushed, for example, the event extraction definition 320 as shown in FIG. 9 is generated. In the event extraction definition 320 shown in FIG. 9, for example, "myR3" is described as a system name of the selected business system A 3, "order intake" is described as an activity name, and "order intake" is described as a primary key name. Furthermore, the "amount of orders received" and "requested delivery date" which are data items in the business system A 3 which are selected according to the selection screen shown in FIG. 8B are described as property names.

FIG. 10 is a diagram showing an arrange example according to an event extraction definition. As shown in FIG. 10, for example, the event extraction unit 32 of the business system A 3 has an order intake extraction definition 320-1 and an inventory inquiry extraction definition 320-2. The event extraction unit 42 of the business system B 4 has an order placement extraction definition 420-1 and an acceptance extraction definition 420-2. Furthermore, the event extraction unit 52 of the business system C 5 has a shipment extraction definition 520-1 and a delivery extraction definition 520-2.

The event extraction unit 32 of the business system A 3 extracts event data from the status DB 31 which manages the status of the application A 30 that executes an order intake business in the business system A 3, according to the order intake extraction definition 320-1. An event type of the event data extracted is order intake, and a primary key is an ID of the order intake slip 35.

The event extraction unit 32 extracts event data from the status DB 31' which manages the status of the application A' 30' that executes an inventory inquiry business in the business system A 3, according to the inventory inquiry extraction definition 320-2. An event type of the event data extracted is inventory inquiry, and a primary key is an ID of the order intake slip 35.

The event extraction unit 42 of the business system B 4 extracts event data from the status DB 41 which manages the status of the application B 40 that executes an order placement business in the business system B 4, according to the order placement extraction definition 420-1. An event type of the event data extracted is order placement, a primary key is an ID of the order placement slip 45, and a relative key is an ID of the order intake slip 35 which the business system A 3 treats.

In addition, the event extraction unit 42 extracts event data from the status DB 41' which manages the status of the application B'40' that executes an acceptance business in the business system B 4, according to the acceptance extraction definition 420-2. An event type of the event data extracted is acceptance, and a primary key is an ID of the order placemen slip 45.

The event extraction unit 52 of the business system C 5 extracts event data from the status DB 51 which manages the status of the application C 50 that executes a shipment business in the business system C 5, according to the shipment extraction definition 520-1. An event type of the event data extracted is shipment, a primary key is an ID of the delivery slip 55, and a relative key is an ID of the order placement slip 45 which the business system B 4 treats.

In addition, the event extraction unit 52 extracts event data from the status DB 51' which manages the status of the application C' 50' that executes a delivery business in the business system C 5, according to the delivery extraction definition 520-2. An event type of the event data extracted is delivery, and a primary key is an ID of the delivery slip 55.

As an implementation method of the event extraction units 32 to 52, various kinds of methods can be used according to applications in business systems. For example, by preparing the extraction definition of event data for Service Access Point (SAP)/R3, a user exit routine is generated automatically and an event is extracted by using the module. In addition, when an application uses a relational database (RDB), by preparing the extraction definition of event data for the RDB, it is possible to automatically generate a trigger module of the RDB and also to extract an event.

Each event data extracted in the business system A 3 to business system C 5 are converted into the XML format as, for example, order placement event data shown in FIG. 11A or order intake event data shown in FIG. 11B, by the event data conversion units 33, 43 and 53 in respective business systems, and are transmitted to the event management apparatus 1 by each of the event data transmission units 34, 44 and 45.

The event data is queued in the event queue 12 of the event management apparatus 1 shown in FIG. 1. The event data extracted and transmitted from the business system A 3 to the business system C 5 by a method according to each application which executes a business within each business system.

Figure 12:
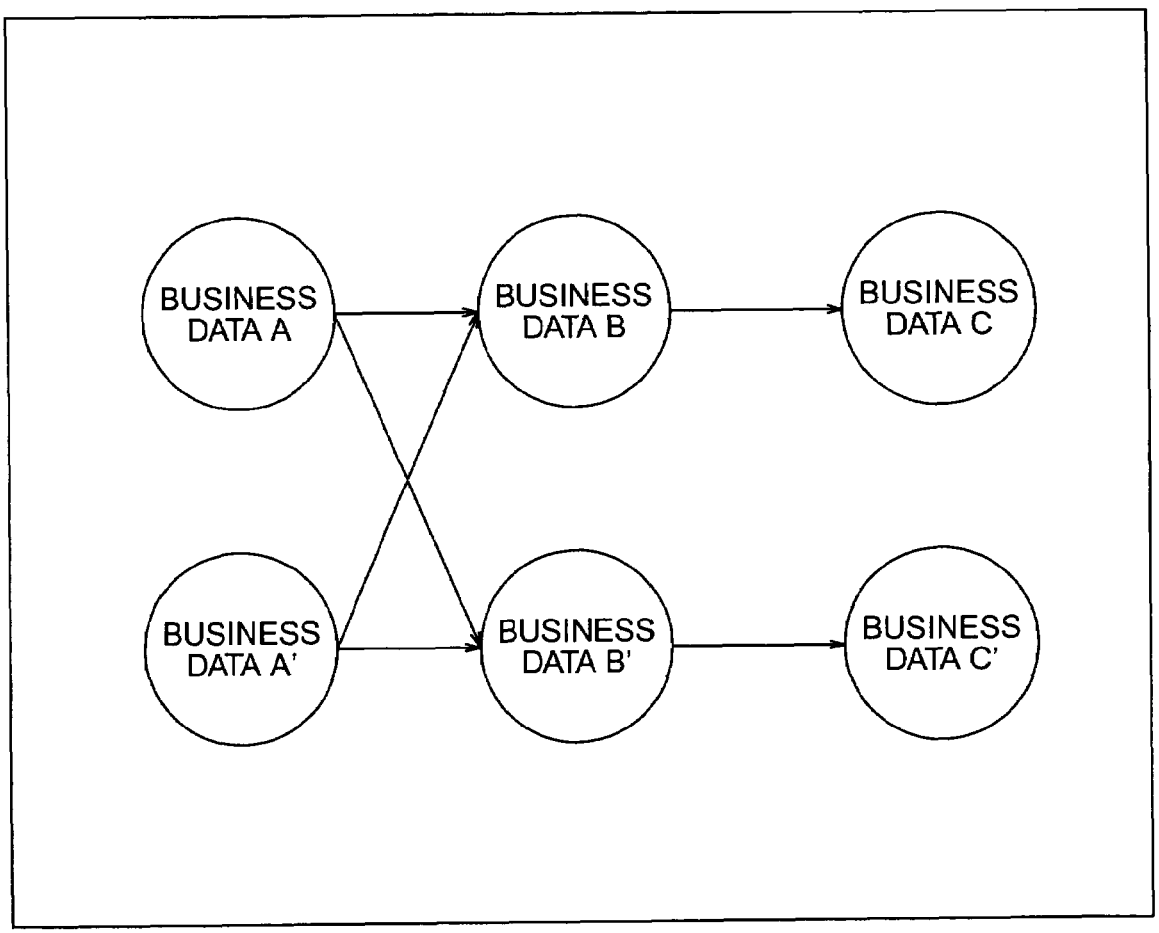
FIG. 12 shows the result of relation of business data.

The event relation unit 13 of the event management apparatus 1 makes groups of the event data in the event queue 12 in units of business data, relates business data, and stores the event data in the event management DB 14. For example, as shown in FIG. 12, in consequence of relation between business data, data relative to the business data A and business data A' is the business data B and business data B', data relative to the business data B is the business data C, and data relative to the business data B' is the business data C'.

The output unit 16 outputs the retrieval result of the event management DB 14 on the basis of the retrieval conditions (for example, a business process name, a slip number, etc.) inputted from the user terminal 6, as described later in detail. The user terminal 6 is provided with the Event Explorer which interprets and displays the retrieval result of the event management DB 14. Thus, a user can access the event management apparatus 1 by using this Event Explorer, and the retrieval result can be displayed on the user terminal 6. In addition, the output unit 16 has feature of displaying the event, which is relative to the business data selected among the business data displayed as the above mentioned retrieval result, in the flow form on the user terminal 6, and feature of displaying the execution situation of the business which flows between business systems.

A user terminal 6 has a feature of accessing the event management apparatus 1 by Web access using an http protocol via a network. The number of user terminals 6 is not limited to one, but voluntary.

FIG. 13 shows an exemplary scalable vector graphic (SVG) file for flow display which is generated from data within the business process DB 15. SVG is a standard language which expresses an image by XML, and the SVG file stores the data in which two-dimensional graphics are described as shown in FIG. 13 by using this language. This SVG file has a form that an identification ID is embedded in vector data.

Figure 14:
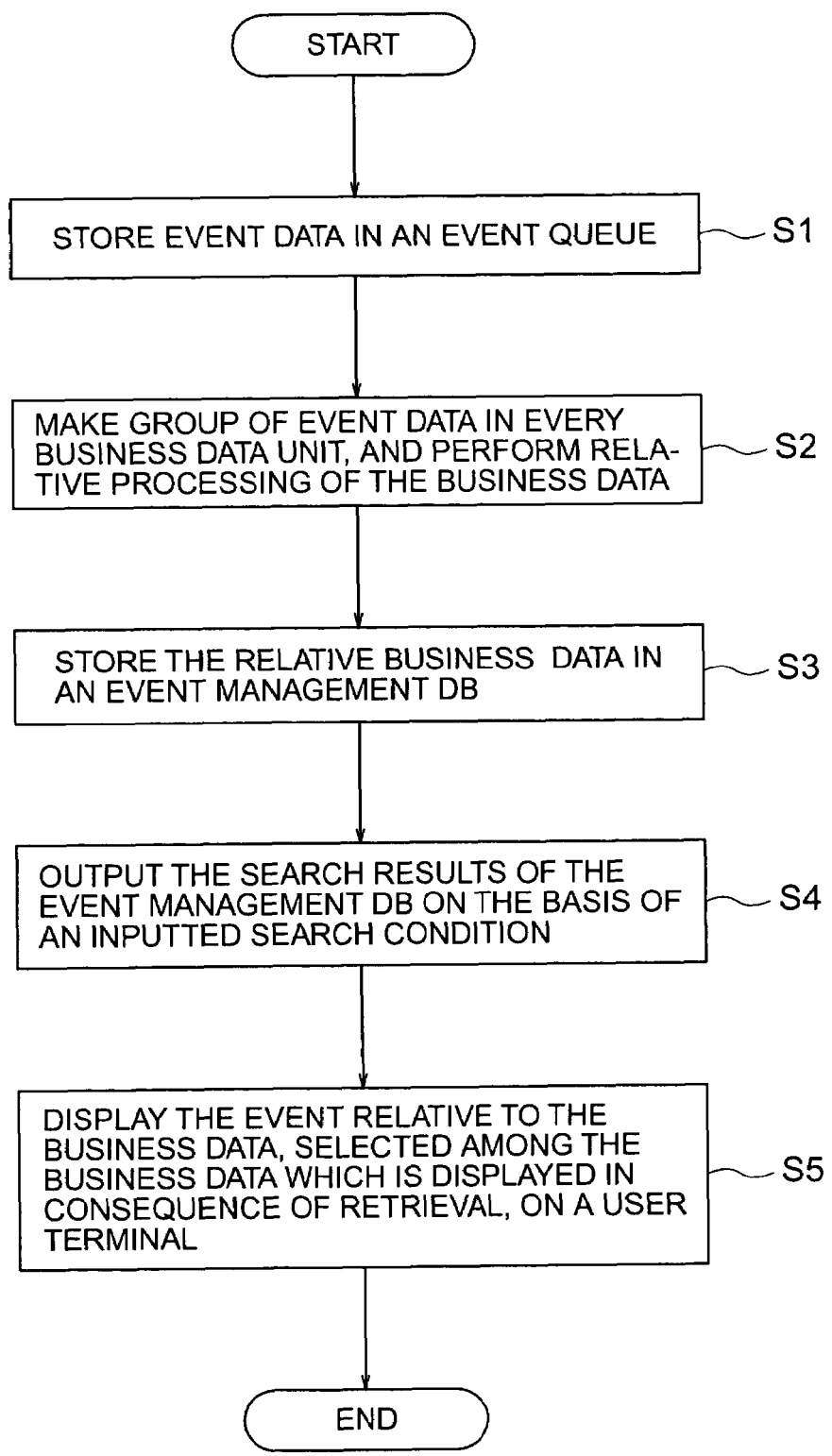
FIG. 14 shows the outline of the processing flow in an event management apparatus.

FIG. 14 shows the outline of a processing flow in the event management apparatus 1. First, event data received from each business system is stored in the event queue 12 (step S1). Next, the event relation unit 13 makes groups of the event data in units of business data, and performs the relative processing of business data (step S2). Then, the relative business data is stored in the event management DB 14 (step S3).

When retrieval conditions are inputted from the user terminal 6, the output unit 16 retrieves the event management DB 14 on the basis of the retrieval conditions inputted from the user terminal 6, and outputs the retrieval result (step S4). When a user selects certain business data among the business data displayed as the above mentioned retrieval result, an event relative to the selected business data is displayed on the user terminal 6 (step S5). The processing is finished when a display end is commanded.

Figure 15:
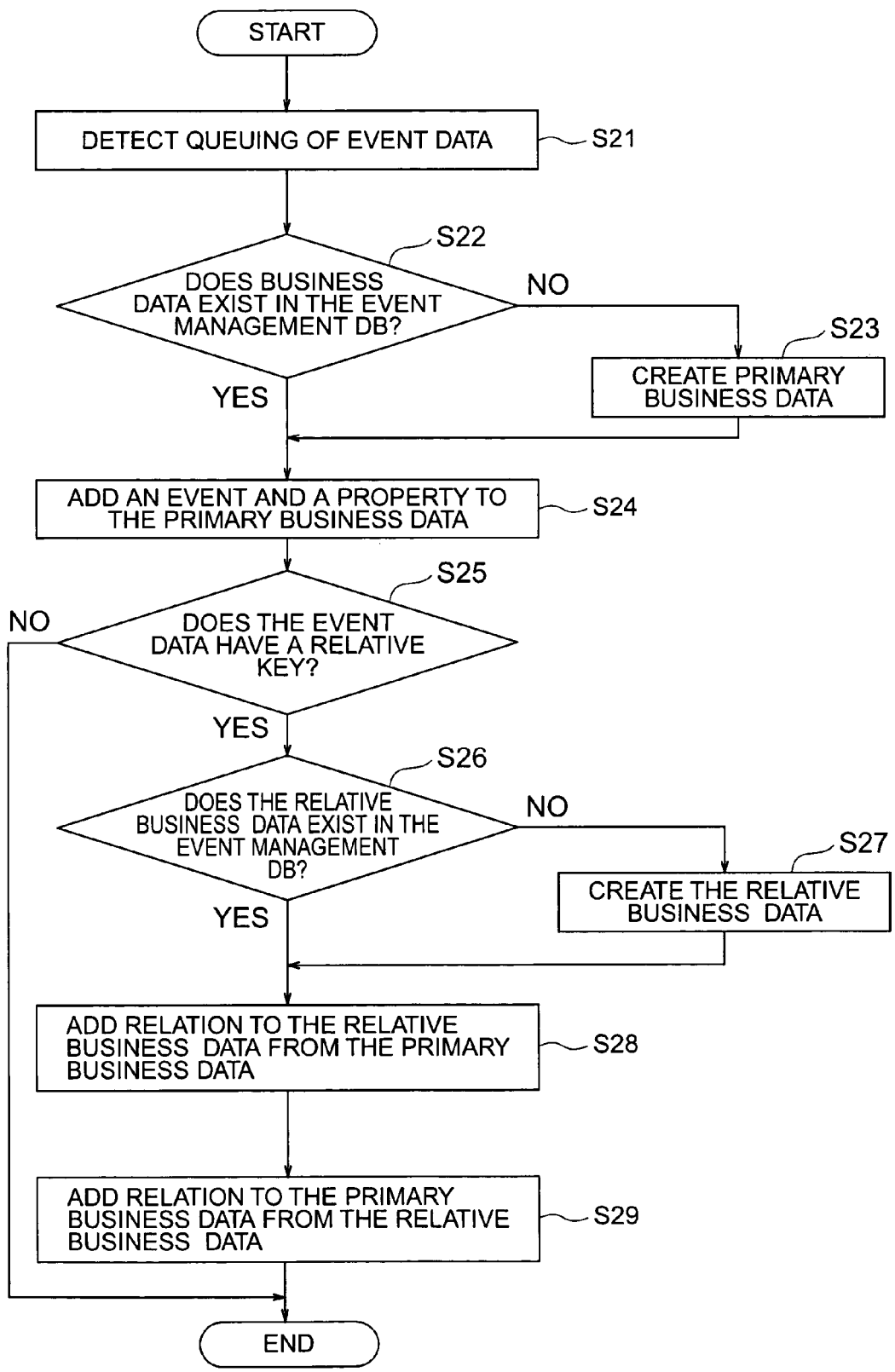
FIG. 15 shows the relative processing flow of business data.

FIG. 15 shows the relative processing flow of business data. When the event relation unit 13 detects the queuing of event data (step S21), the event relation unit 13 determines whether business data corresponding to the primary key (this is called primary business data) exists in the event management DB 14 (step S22). When the primary business data does not exist, the event relation unit 13 generates primary business data (step S23). Then, the process goes to step S24.

For example, the event relation unit 13 receives the event data "event name: order intake, primary key (order placement slip ID): p101, relative key (order intake slip ID): o001, start time: 10:00 on Aug. 27, 2003, property (unit price): 1000" in the XML format which is shown in FIG. 16A. Then, the event relation unit 13 determines whether primary business data corresponding to "primary key: p101" exists inside the event management DB 14. When not exist, the event relation unit 13 generates an order placement slip as primary business data. For example, an order placement slip as shown in FIG. 16B is generated.

When primary business data exists in the event management DB 14, the event relation unit 13 adds an event and a property taken from the event to the primary business data (step S24). For example, an event name of "order placement" and the start time of "10:00 on Aug. 27, 2003" are added to an order placement slip as an event such as "<bpm: eventName> order placement </bpm: eventName>" and "<bpm: startTime>20030827T1000</bpm: startTime>", in the order placement slip shown in FIG. 16B. In addition, a unit price of "1000" is added as a property such as "<bpm: property name="unit price">1000</bpm: property>", in the order placement slip.

Next, the event relation unit 13 determines whether a relative key is in the event data (step S25). When there is the relative key, the event relation unit 13 further determines whether the business data corresponding to a relative key (this is called relative business data) exists in the event management DB 14 (step S26).

When the relative business data does not exist in the event management DB 14, the event relation unit 13 generates relative business data (step S27), and the process goes to step S28. For example, as shown in FIG. 16C, an order intake slip is generated as the relative business data.

When relative business data exists, the event relation unit 13 adds the relation to the relative business data from the primary business data (step S28). For example, "o001" of the order intake slip ID is described into the order placement slip, and the relation to the order intake slip is added such as "<bpm: relativeKey type="order intake slip"> o001</bpm: relativeKey>", in the order placement slip shown in FIG. 16B.

In addition, the event relation unit 13 adds the relation to the primary business data from the relative business data (step S29). For example, "p101" of the order placement slip ID is described into the order intake slip, and the relation to the order placement slip is added such as "<bpm: relativeKey type="order placement slip"> p001 </bpm: relativeKey>", in the order intake slip shown in FIG. 16C.

Figure 17:
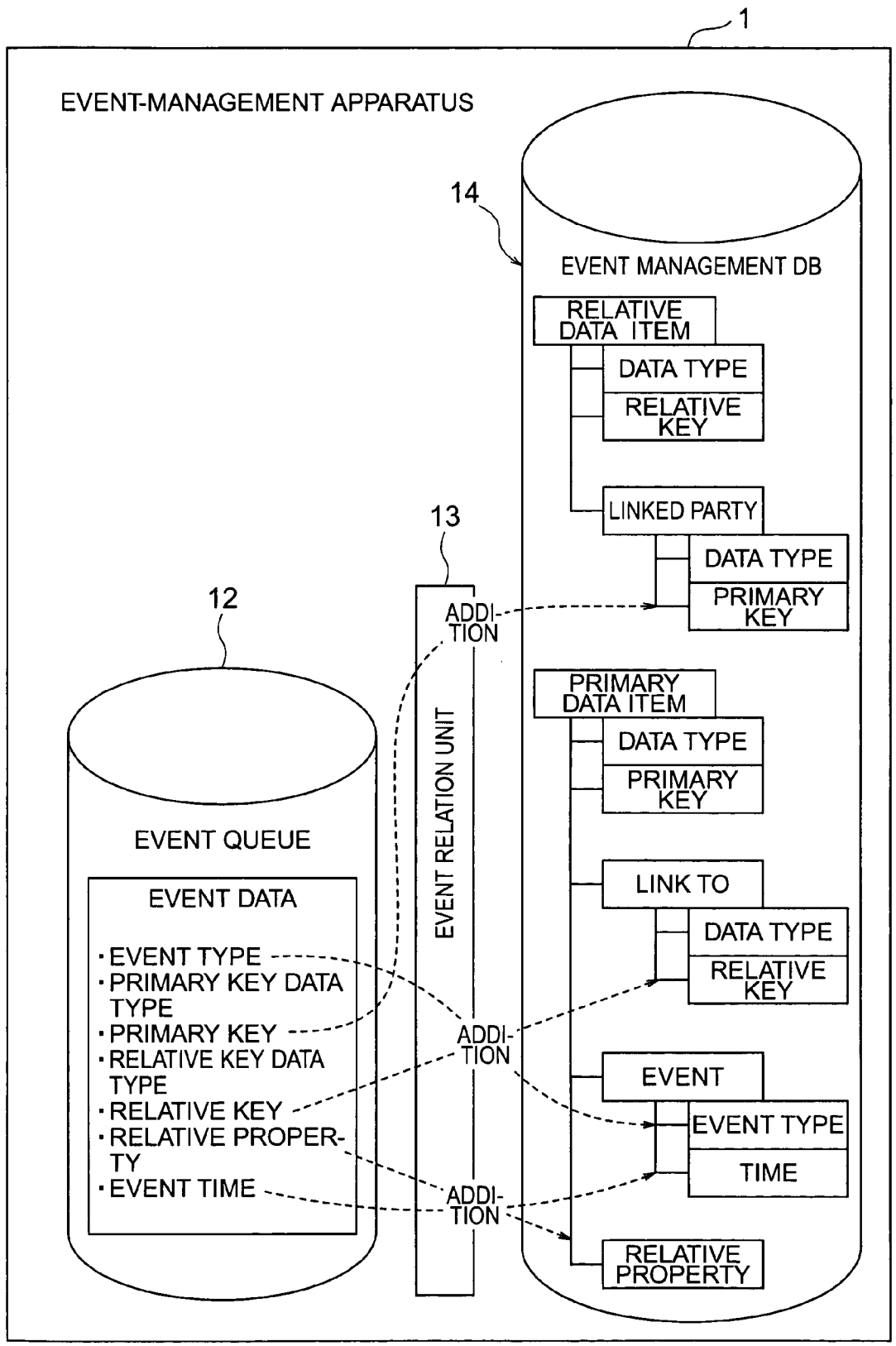
FIG. 17 is a schematic diagram for explaining the relative processing of business data.

FIG. 17 is a schematic diagram for explaining the relative processing of business data. Event data is queued in the event queue 12 of the event management apparatus 1. The event data queued comprises elements such as an event type (or event name), a primary key data type, a primary key, a relative key data type, a relative key, a relative property, and event time.

The event relation unit 13 relates business data according to the relative processing flow of business data explained by FIG. 15 described above. In consequence, business data as shown in FIG. 17 is generated in the event management DB 14. Arrows shown by dotted lines in FIG. 17 show the correspondence of respective elements in event data to the business data generated in the event management DB 14.

In FIG. 17, the event relation unit 13 generates primary business data corresponding to a primary key by providing a primary data item and storing a data type and the primary key in this item. Then, the event relation unit 13 performs the following processing. That is, an event type and time are added as an event to the primary business data, and a relative property is added. When a relative key is in the event data, relative business data is generated by providing a relative data item and storing the data type and relative key in this item. Then, the relation to the relative business data is added by storing the data type and relative key as linked party information in the primary business data. In addition, the relation to the primary business data is added by storing the data type and primary key as linked party information also in relative business data.

As shown in FIG. 17, two-way reference between business data beforehand are generated on the basis of the relation between the business data acquired (or collected) as event data. Due to this generation, tracking speed is improved in retrieval processing by the output unit 16 described later.

Figure 18:
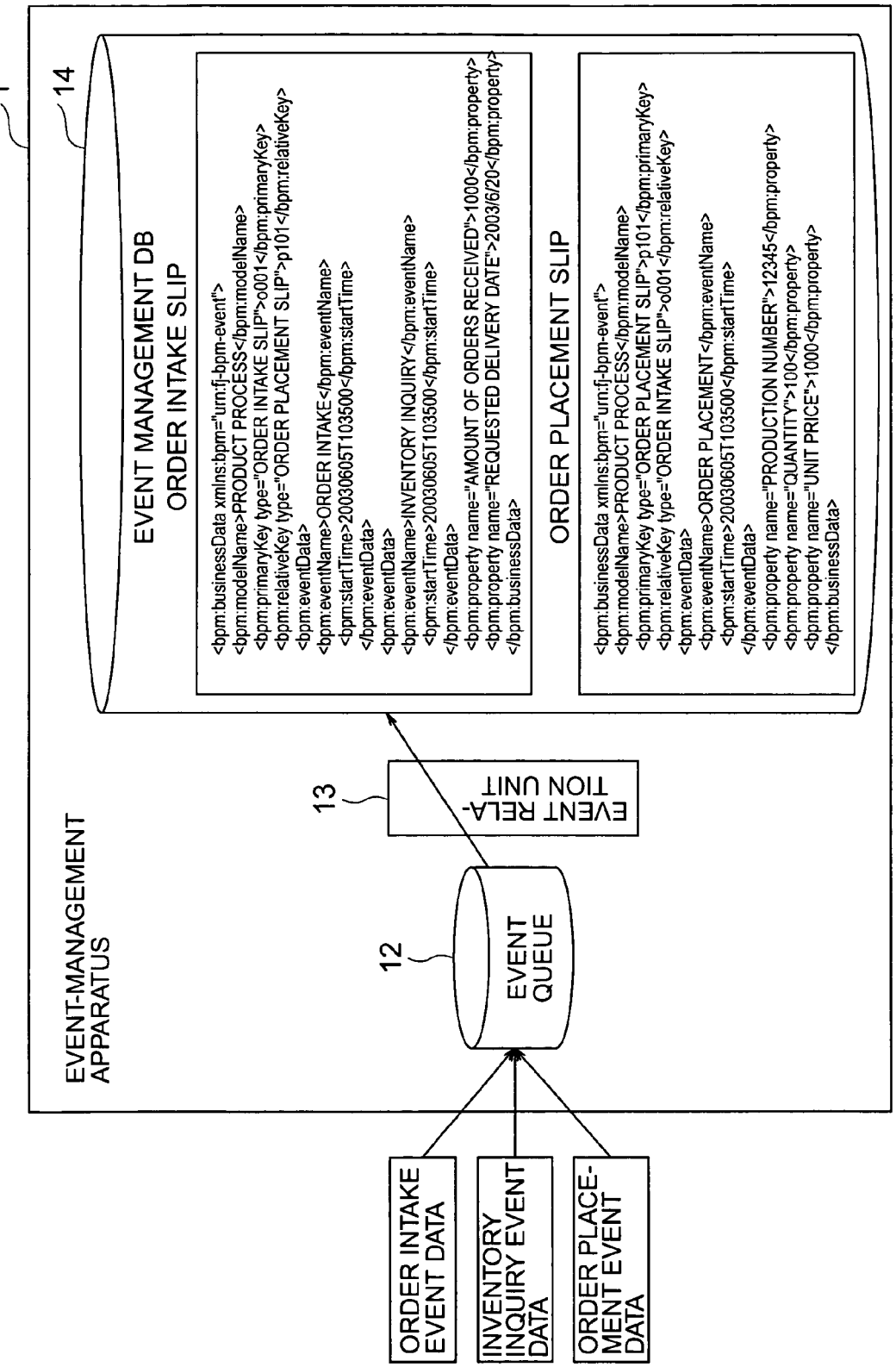
FIG. 18 shows the relation of business data.

FIG. 18 shows the exemplary relation of business data at the time of receiving order intake event data, inventory inquiry event data, and order placement event data. An order intake slip and an order placement slip as shown in FIG. 18 are generated in the event management DB 14 as the result of the relative processing of business data explained in FIG. 15 mentioned above. In this order intake slip, "Order intake" and "inventory inquiry" are stored as events, and "p101" of an order placement slip ID is described as a relative key, and the relation to the order placement slip is added. Further, in the order placement slip, "o001" of an order intake slip ID is described as a relative key, and the relation to the order intake slip is added.

Figure 19:
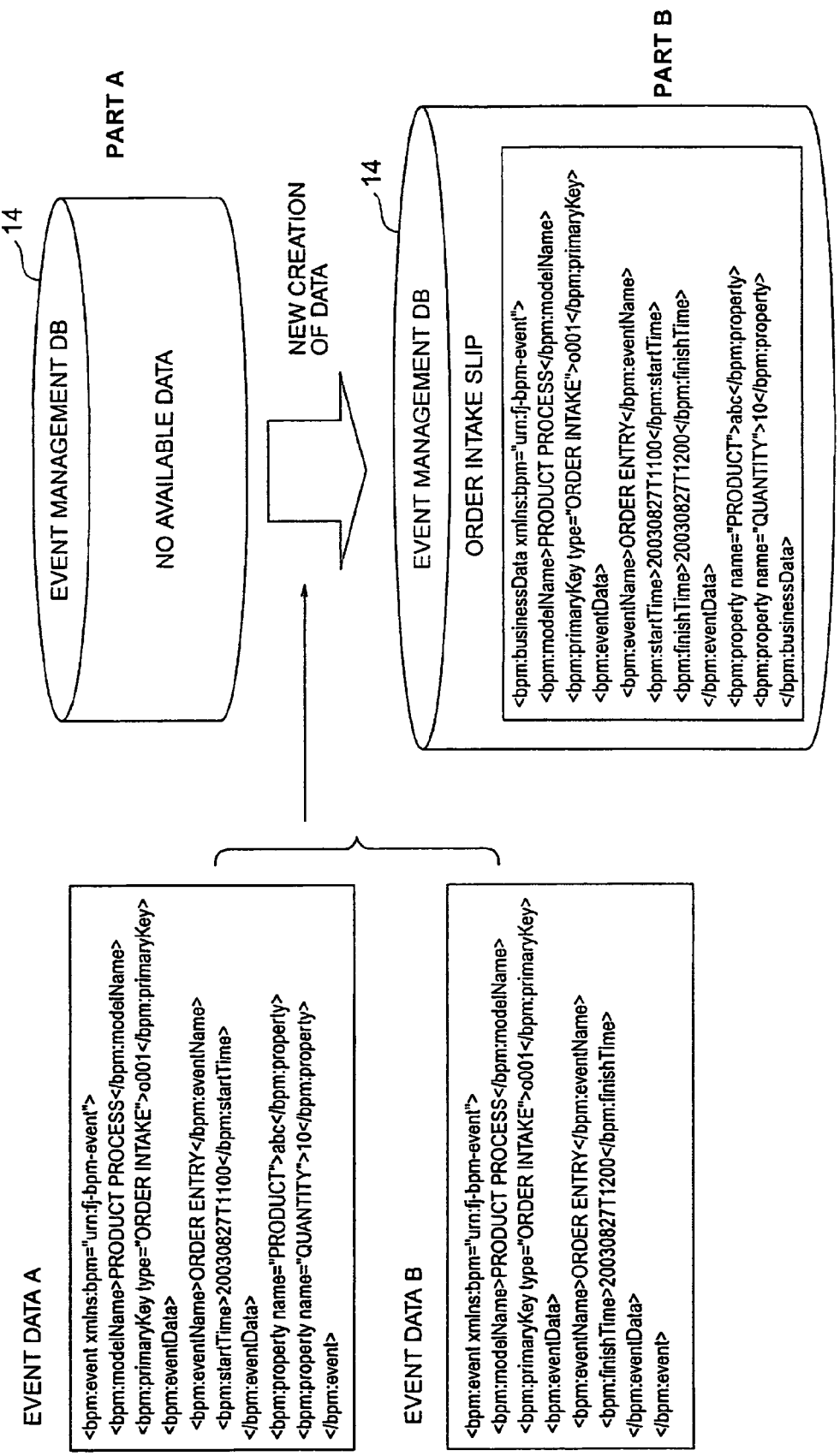
FIGS. 19 to 21 show examples of creation processing of business data (slip).

FIG. 19 show an exemplary generation processing of business data (slip) in the case that there is no data in the event management DB 14 in the beginning. Supposing the event data A and event data B is queued in the event queue 12 when there is no data in the event management DB14 as shown in PART A, the event relation unit 13 generates an order intake slip as shown in PART B on the basis of the event data A and event data B.

That is, the event relation unit 13 generates an order intake slip as primary business data corresponding to the primary key "o001" in the event data A, adds "event name: order entry", "start time: 11:00 on Aug. 27, 2003", and "finish time: 12:00 on Aug. 27, 2003" as an event, and adds "property name: product", "property: abc" and "property name: quantity", and "property: 10".

Figure 20:
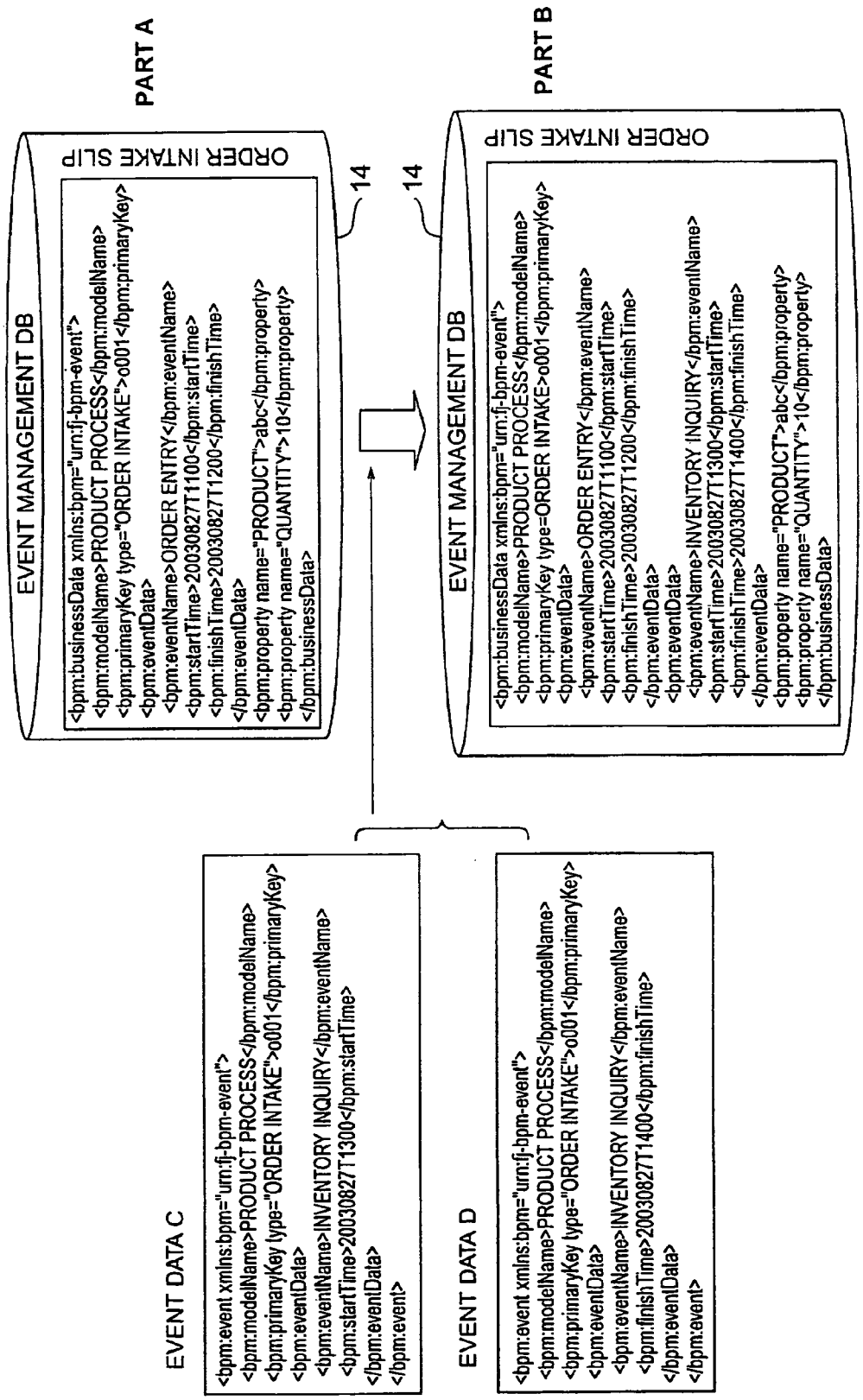

FIG. 20 shows an exemplary generation processing of business data (slip) in the case that the order intake slip shown in PART A has been already generated in the event management DB 14. Supposing the event data C and event data D is queued in the event queue 12 when the order intake slip shown in PART A has been already generated in the event management DB 14, the event relation unit 13 generates an order intake slip as shown in PART B on the basis of the event data C and event data D.

That is, the event relation unit 13 adds "event name: inventory inquiry", "start time: 13:00 on Aug. 27, 2003", and "finish time: 14:00 on Aug. 27, 2003" in the order intake slip shown in PART A as an event, so that a new order intake slip shown in PART B is generated.

Figure 21:
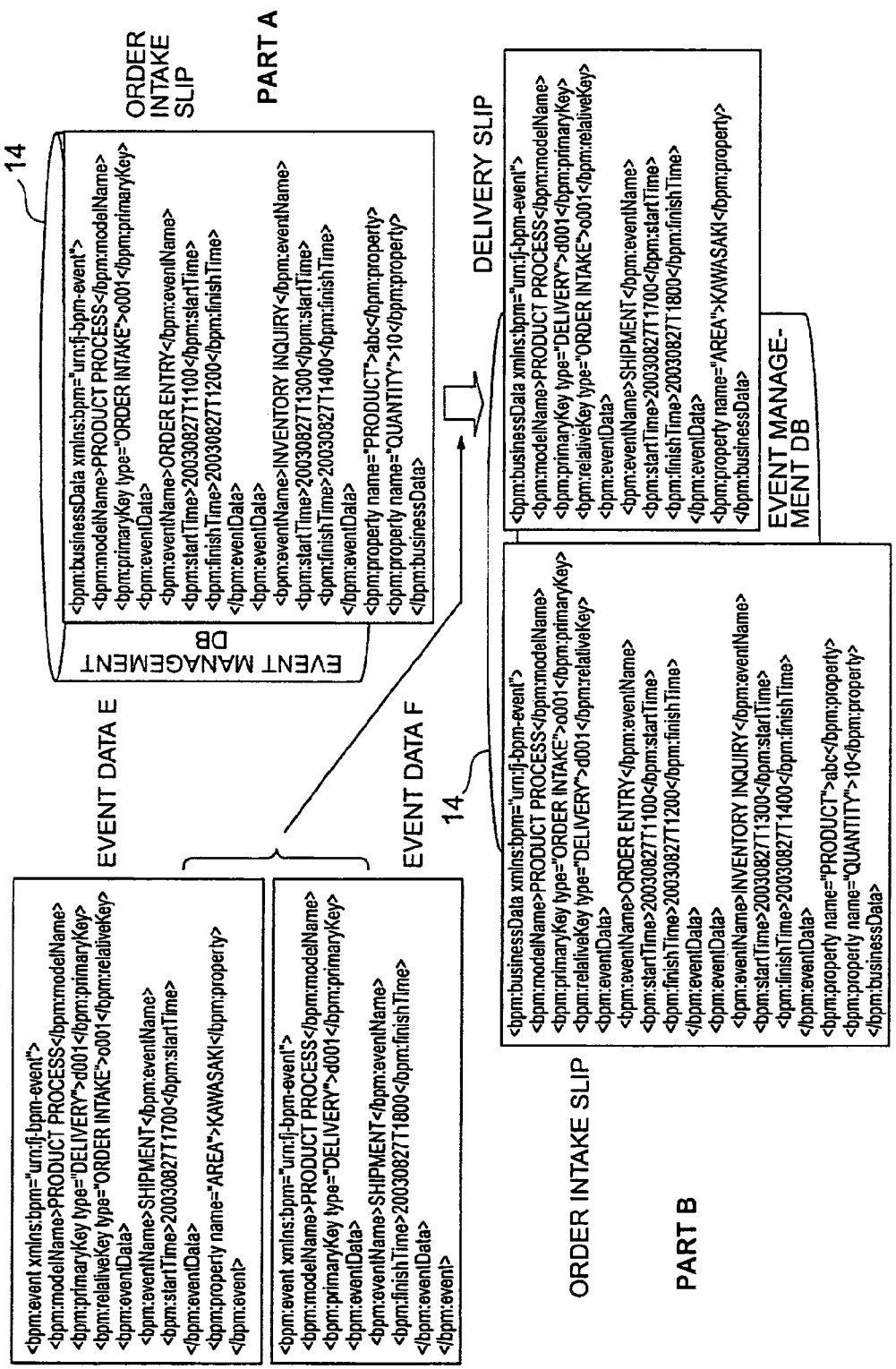

FIG. 21 shows exemplary generation processing of business data (slip) in the case that the order intake slip shown in PART A has been already generated in the event management DB 14. Supposing the event data E and event data F is queued in the event queue 12 when the order intake slip shown in PART A has been already generated in the event management DB 14, the event relation unit 13 generates an order intake slip and a delivery slip as shown in PART B on the basis of the event data E and event data F.

That is, the event relation unit 13 generates the delivery slip as primary business data corresponding to the primary key "d001" in the event data E, adds "event name: shipment", "start time: 17:00 on Aug. 27, 2003", and "finish time: 18:00 on Aug. 27, 2003" as an event, and adds "property name: area", "property: Kawasaki". In addition, the event relation unit 13 adds the relation to the order intake slip by describing "<bpm: relativeKey type="order intake"> o001 </bpm: relativeKey>", in the generated delivery slip. Further, the event relation unit 13 adds the relation to the delivery slip by describing "<bpm: relativeKey type="delivery"> d001</bpm: relativeKey>", in the order intake slip.

Figure 22:
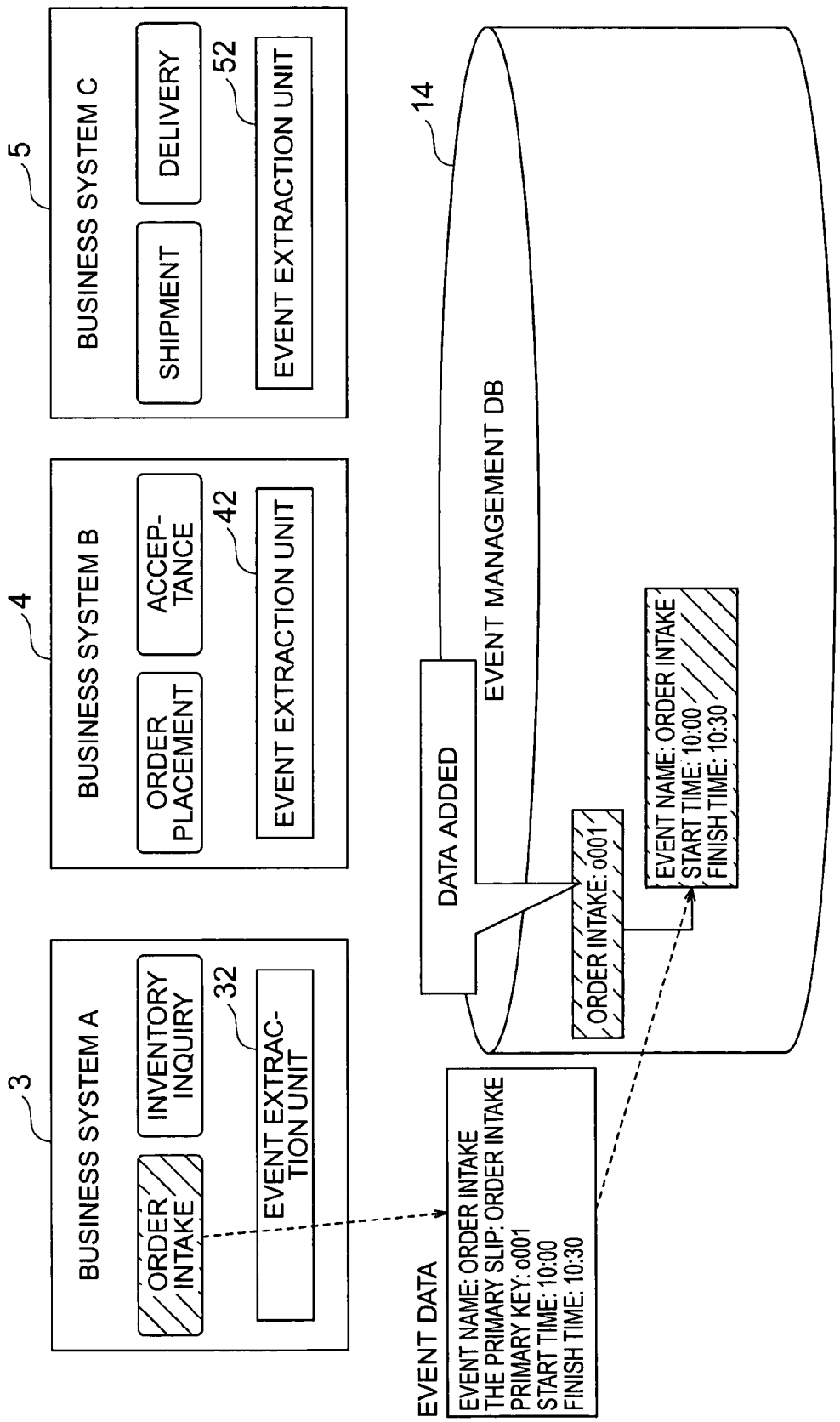
FIGS. 22 to 27 are explanatory diagrams of the flow of event collection from a plurality of business systems.

FIGS. 22 to 27 is an explanatory diagram of the flow of event collection from a plurality of business systems. As shown in FIG. 22, for example, in the business system A 3, at the timing that the order intake business shown by hatching is finished, when the event data "event name: order intake, main slip: order intake, primary key: o001, start time: 10:00, and finish time: 10:30 which is extracted by the event extraction unit 32 is queued into the event queue 12 of the event management apparatus 1, "order intake: o001" is described as a primary data item and an order intake slip is generated in the event management DB 14 as shown by hatching. In addition, as shown by hatching, an event "event name: order intake" and "start time: 10:00, finish time: 10:30" is added to the generated order intake slip.

Figure 23:
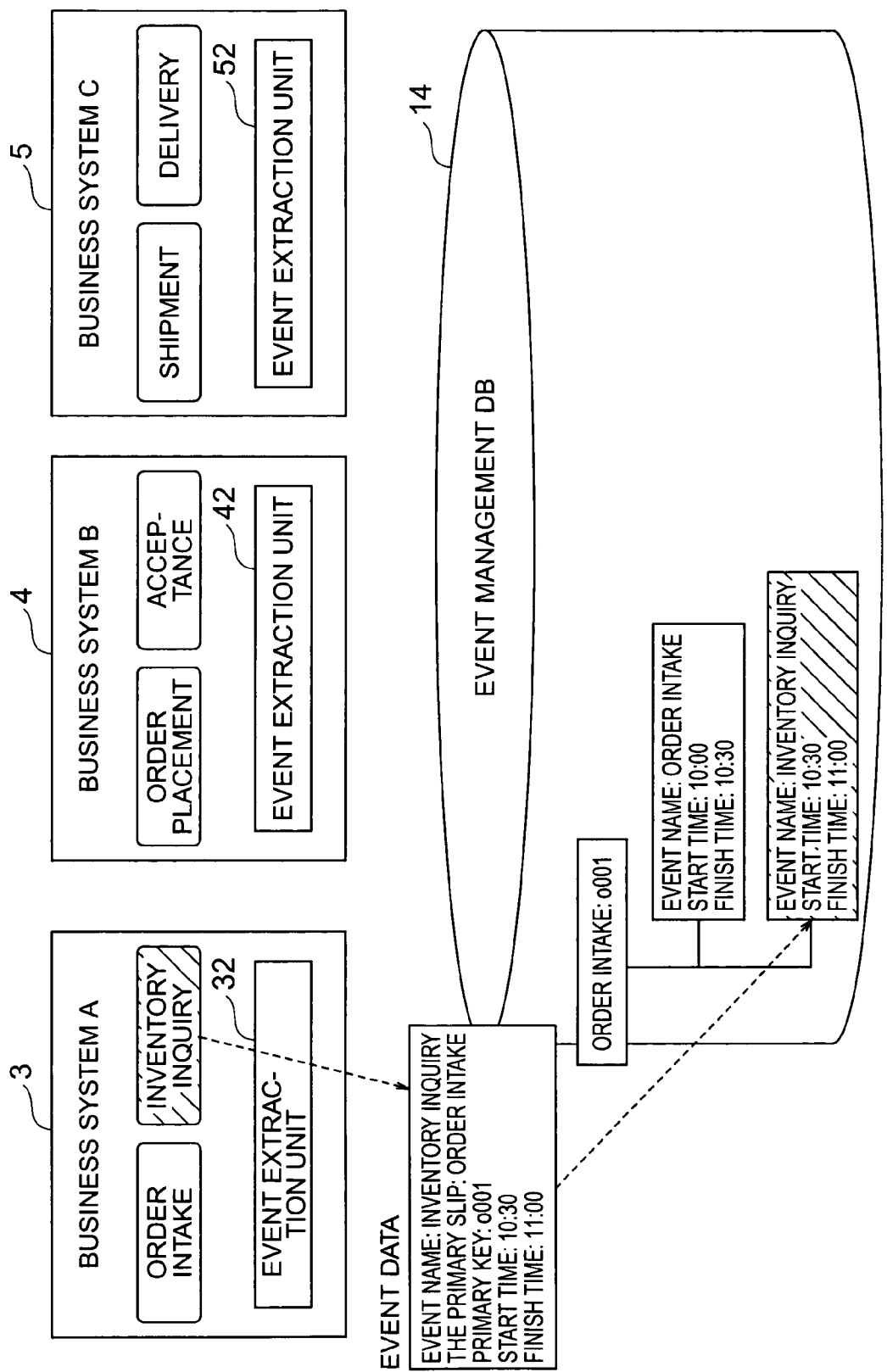

As shown in FIG. 23, in the business system A 3, at the timing that the inventory inquiry business shown by hatching is finished, when the event data "event name: inventory inquiry, main slip: order intake, primary key: o001, start time: 10:30, and finish time: 11:00" which is extracted by the event extraction unit 32 is queued into the event queue 12, an event "event name: inventory inquiry, start time: 10:30, and finish time: 11:00" is added to the order intake slip, which has been already generated, as shown by hatching on the basis of the contents of this event data.

Figure 24:
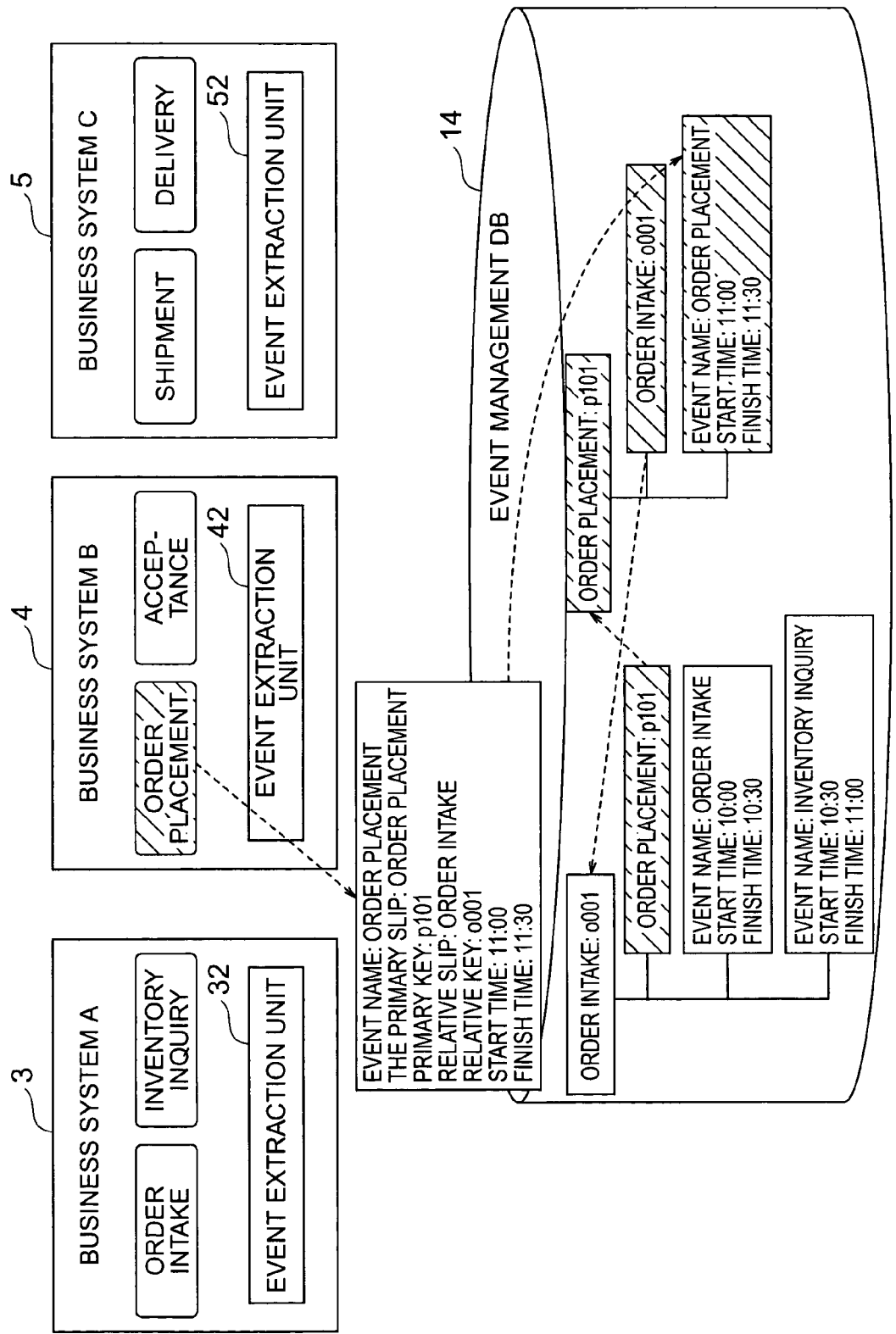

In addition, as shown in FIG. 24, in the business system B 4, at the timing that the order placement business shown by hatching is finished, when the event data "event name: order placement, main slip: order placement, primary key: p101, relative slip: order intake, relative key: o001, start time: 11:00, and finish time: 11:30" which is extracted by the event extraction unit 42 is queued into the event queue 12, the relation of business data (slips) is performed as follows.

First, "order placement: p101" shown by hatching is described as a primary data item, and an order placement slip corresponding to a primary key "p101" is generated. Then, an event "event name: order placement, start time: 11:00, finish time: 11:30" is added to the generated order placement slip. Since "o001" of the order intake slip ID is described as the relative key in the event data, the relation to the order intake slip is performed by describing "o001" of the order intake slip ID shown by hatching in the order placement slip. In addition, "p101" of the order placement slip ID shown by hatching is described in the order intake slip, and the relation to the order intake slip is performed.

Figure 25:
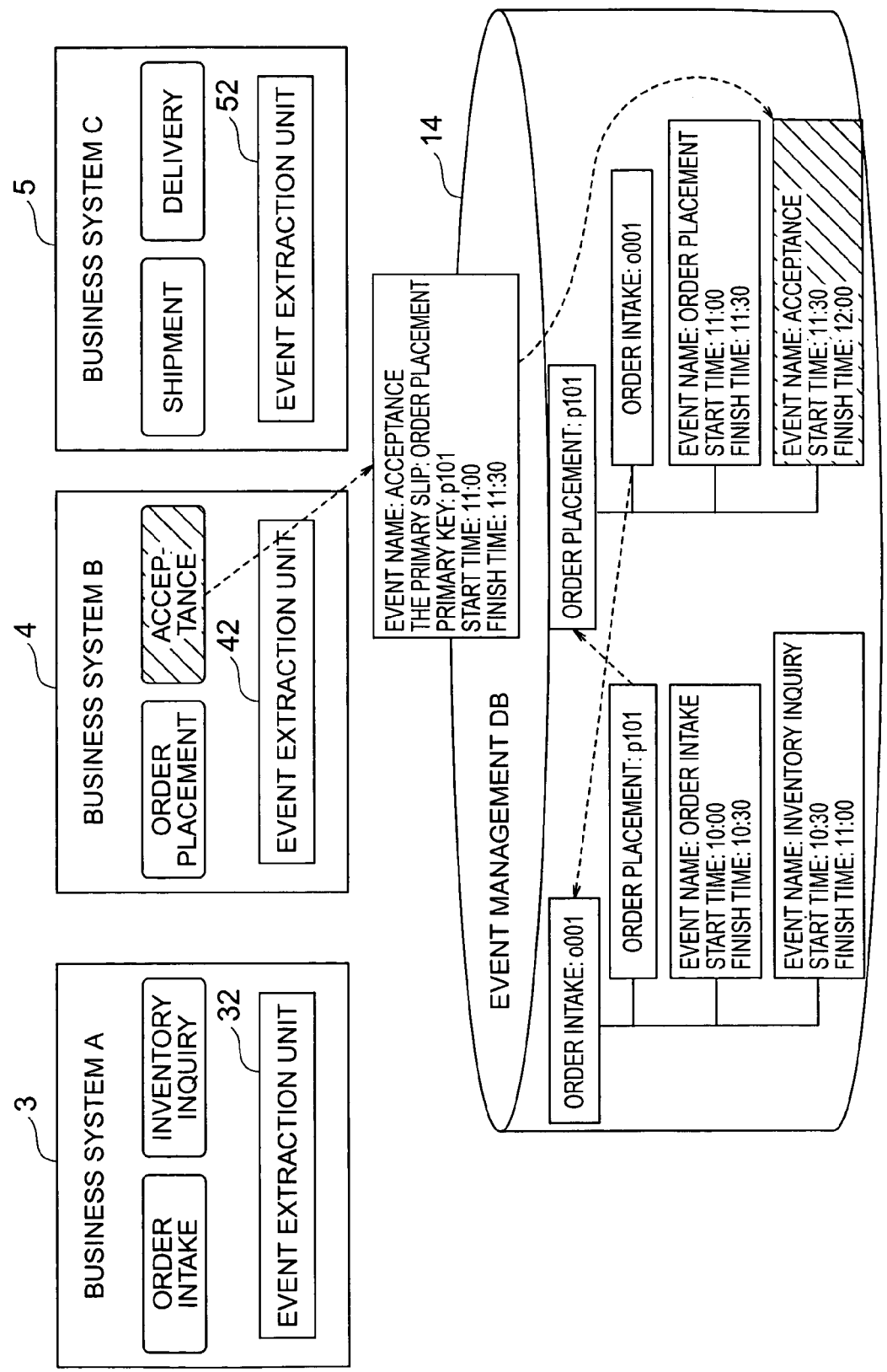

In addition, as shown in FIG. 25, in the business system B 4, at the time that the acceptance business shown by hatching is finished, when the event data "event name: order intake, primary slip: order placement, primary key: p101, start time: 11:30, and finish time: 12:00" which is extracted by the event extraction unit 42 is queued into the event queue 12, an event "event name: acceptance, start time: 11:30, and finish time: 12:00" is added to the order placement slip, which has been already generated, as shown by hatching on the basis of the contents of this event data.

Figure 26:
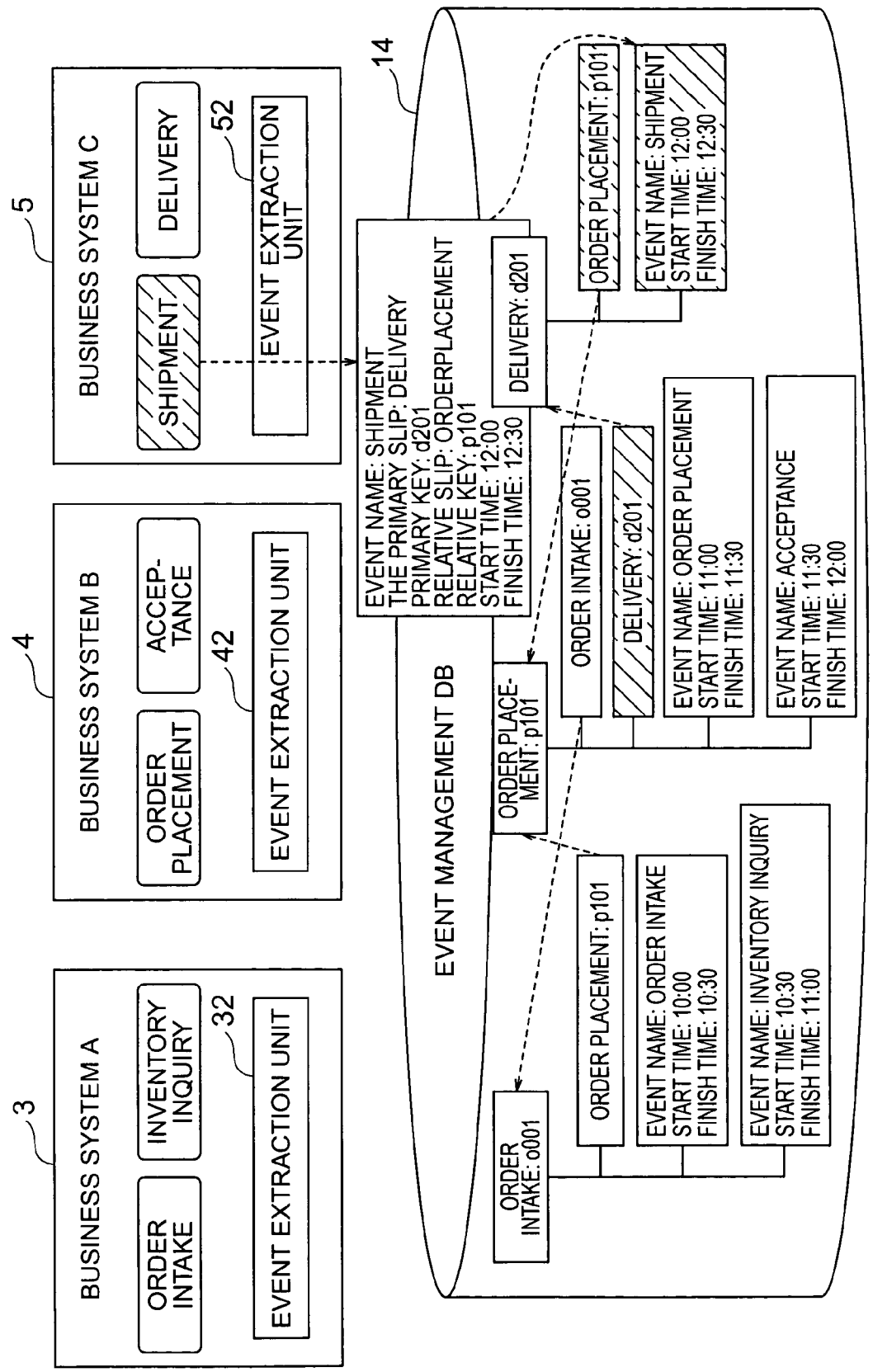

In addition, as shown in FIG. 26, in the business system C 5, at the time that the shipment business shown by hatching is finished, when the event data "event name: shipment, primary slip: delivery, primary key: d201, relative slip: order placement, relative key: p101, start time: 12:00, and finish time: 12:30" which is extracted by the event extraction unit 52 is queued into the event queue 12, the relation of business data (slips) is performed as follows.

First, "delivery: d201" is described as a primary data item, and a delivery slip corresponding to the primary key "d201" is generated. Then, an event "event name: delivery, start time: 12:00, finish time: 12:30" is added. Furthermore, since "p101" of the order placement slip ID is described as the relative key in the event data, the relation to the order placement slip is performed by describing "p101" of the order placement slip ID shown by hatching in the delivery slip. In addition, "d201" of the delivery slip ID shown with hatching is described in the order placement slip, and the relation to the delivery slip is performed.

Figure 27:
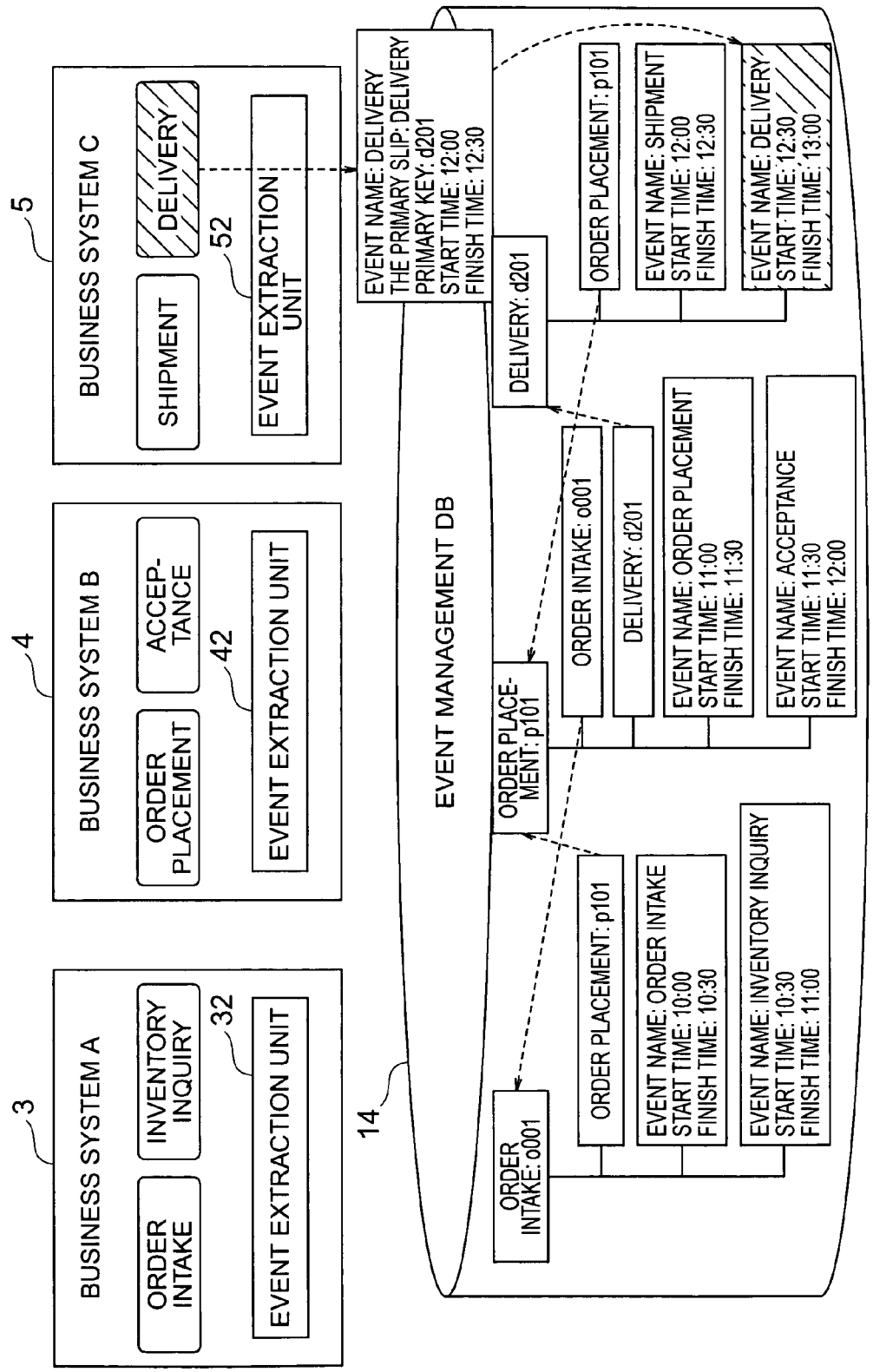

In addition, as shown in FIG. 27, in the business system C 5, at the time that the delivery business shown by hatching is finished, when the event data "event name: delivery, primary slip: delivery, primary key: d201, start time: 12:30, and finish time: 13:00" which is extracted by the event extraction unit 52 is queued into the event queue 12, an event "event name: delivery, start time: 12:30, and finish time: 13:00" is added into the delivery slip, which has been already generated, as shown by hatching on the basis of the contents of this event data.

FIGS. 28 and 29 show exemplary retrieval condition input screens of business data in the user terminal 6. A user inputs conditions on tracking of the flow of a business with paying attention to which data into the event management apparatus 1 by using the retrieval condition input screen shown in FIG. 28.

In the exemplary retrieval condition input screen shown in FIG. 28, "sample1" is selected as a business process, a "delivery" slip as a retrieval object, a "slip number" as a retrieval item, and "Jan. 1, 2003 to Oct. 1, 2003" as a retrieval range. In addition, "display by Event Explorer" is selected as a result display method. When "retrieval execution" is pushed, the retrieval of the event management DB 14 in the event management apparatus 1 is started. Examples of the retrieval result display will be explained by using FIGS. 31, 32 and 33.

FIG. 29 shows an example at the time of selecting "display by list" as a retrieval result display method on the retrieval condition input screen. In this example, "production and sales" is selected as a business process, "order intake" as a retrieval object, and "Jan. 1, 2003 to Jan. 1, 2003" as a retrieval range. Furthermore, when "display by list" is selected as the result display method and then "retrieval execution" is pushed, for example, the retrieval result as shown in FIG. 30 is displayed. In this example, slip numbers "o002", "o001", "o011" are displayed as the retrieval result.

Figure 31:
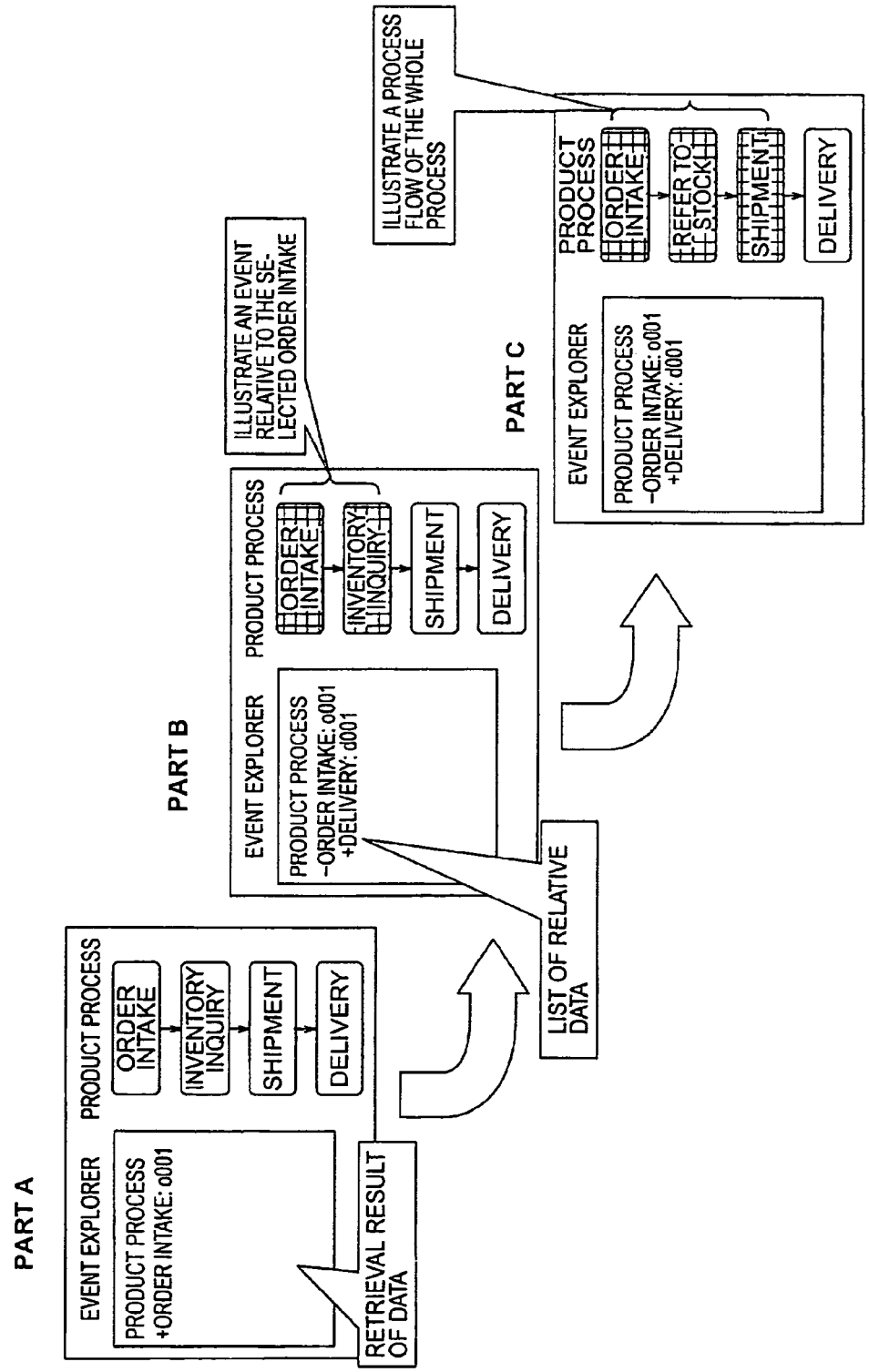
FIG. 31 shows exemplary operation and display in the tracking process of a business process.

FIG. 31 shows exemplary operation and display in the tracking process of a business process. Here, it is shown that an example of the case that a business process selected on the retrieval condition input screen is a "product process". As a result of retrieving the event management DB 14, for example, as shown in PART A, "order intake: o001" which is a primary data item of an order intake slip is displayed on a display area of Event Explorer of the user terminal 6, and a product process is displayed in its side. "+ order intake: o001" displayed on the region of this Event Explorer shows that a node "order intake: o001" is closed, i.e., a primary data item of the order intake slip is not selected.

Next, "order intake: o001" is selected by using the displayed Event Explorer. Since the primary data item of the order intake slip is selected, as shown in PART B, due to this selection, the node "order intake: o001" is opened, "– Order intake: o001" is displayed, and relative data "+ delivery: d001" to the delivery slip which is relative business data is displayed. Since "order intake: o001" is selected, an event of "order entry" and an event of "inventory inquiry", which are relative to the order intake slip, are retrieved. As a result of this, in the product process displayed beside Event Explorer, for example, as shown by double-hatching, the activities relative to both events are changed for color and displayed. Without changing the color, properties such as thickness of characters and lines of the activities may be changed to display them. This can be easily achieved by generating data, which is used for illustration of a flow, beforehand by SVG (scalable vector graphic) and changing properties such as color and thickness of characters and lines of objects in SVG.

Next, when "+ delivery: d001" shown in PART B is selected, a node "delivery: d001" is opened as shown in an area of Event Explorer in PART C, and then "– delivery: d001" is displayed instead. Then, the event of "shipment" relative to "delivery: d001" selected is retrieved, and as shown by double hatching, the activities relative to the event of "shipment" are changed for color and displayed in a product process.

Figure 32:
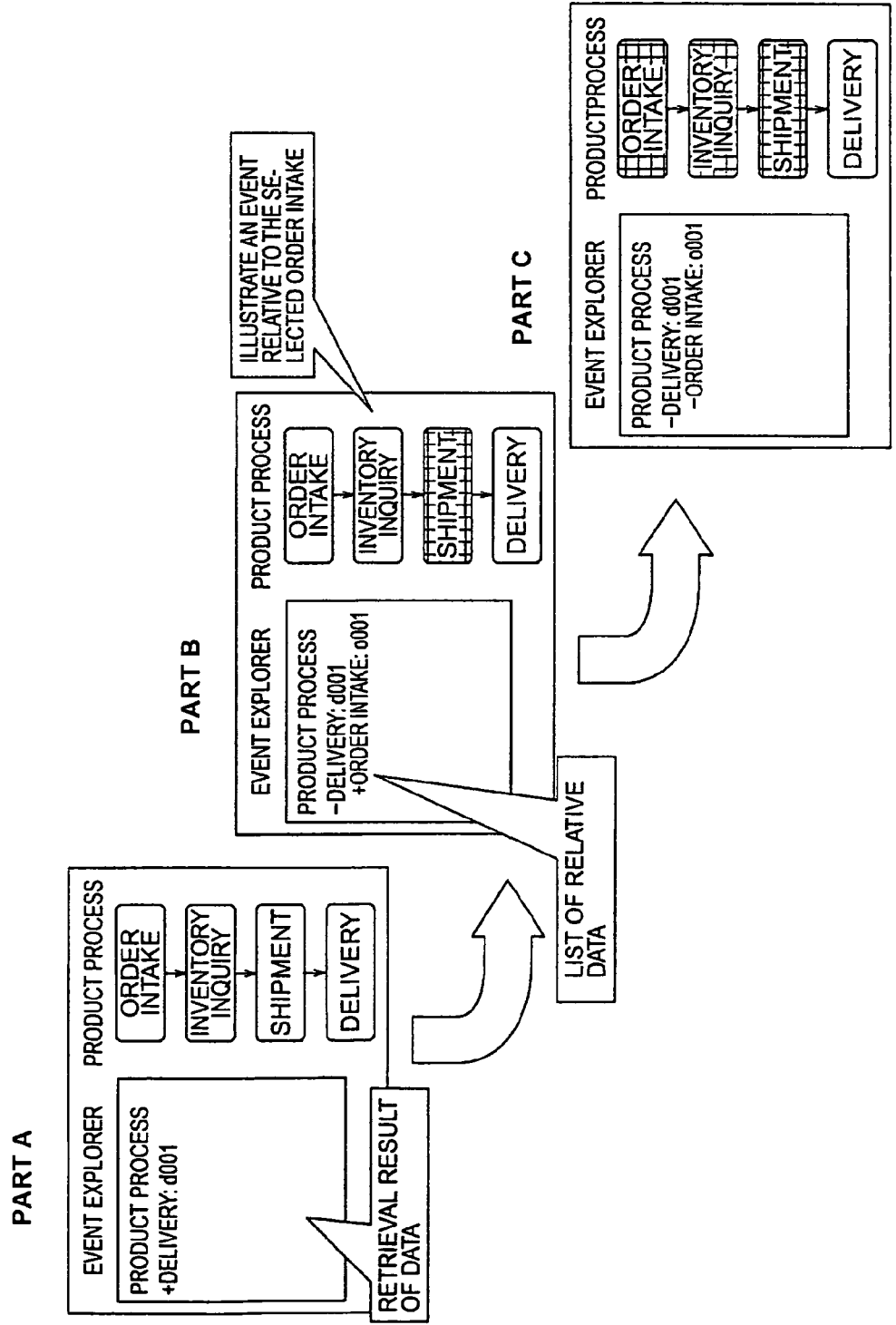
FIG. 32 shows exemplary operation and display in the back tracking process of a business process.

FIG. 32 shows exemplary operation and display in a back tracking process of a business process. As a result of retrieving event management DB 14, for example, it is assumed that, as shown in PART A, "delivery: d001" which is a primary data item of a delivery slip is displayed on a display area of Event Explorer of the user terminal 6, and a product process is displayed in its side. Then, "delivery: d001" is selected on this screen of Event Explorer. Due to this selection, since the primary data item of the delivery slip is selected, as shown in PART B, a node "delivery: d001" is opened, "– delivery: d001"is displayed, and then data "+order intake: o001" relative to the order intake slip which is relative to business data is displayed. Since "delivery: d001" is selected, the event of "shipment" relative to the delivery slip is retrieved, and the activities relative to the event of "shipment" are changed for color and displayed as shown by double hatching, for example, in a product process shown in PART B.

Next, when "+order intake: o001" shown in PART B is selected, a node "order intake: o001" is opened as shown in an area of Event Explorer in PART C, and then "– order intake: o001" is displayed instead. Then, the event of "order entry" and the event of "inventory inquiry" which are relative to "order intake: o001" selected are retrieved, and the activities relative to these events are changed for color and displayed, for example, as shown by double hatching in a product process shown in PART C. Thus, the back tracking of going back events by turns is also possible.

Figure 33:
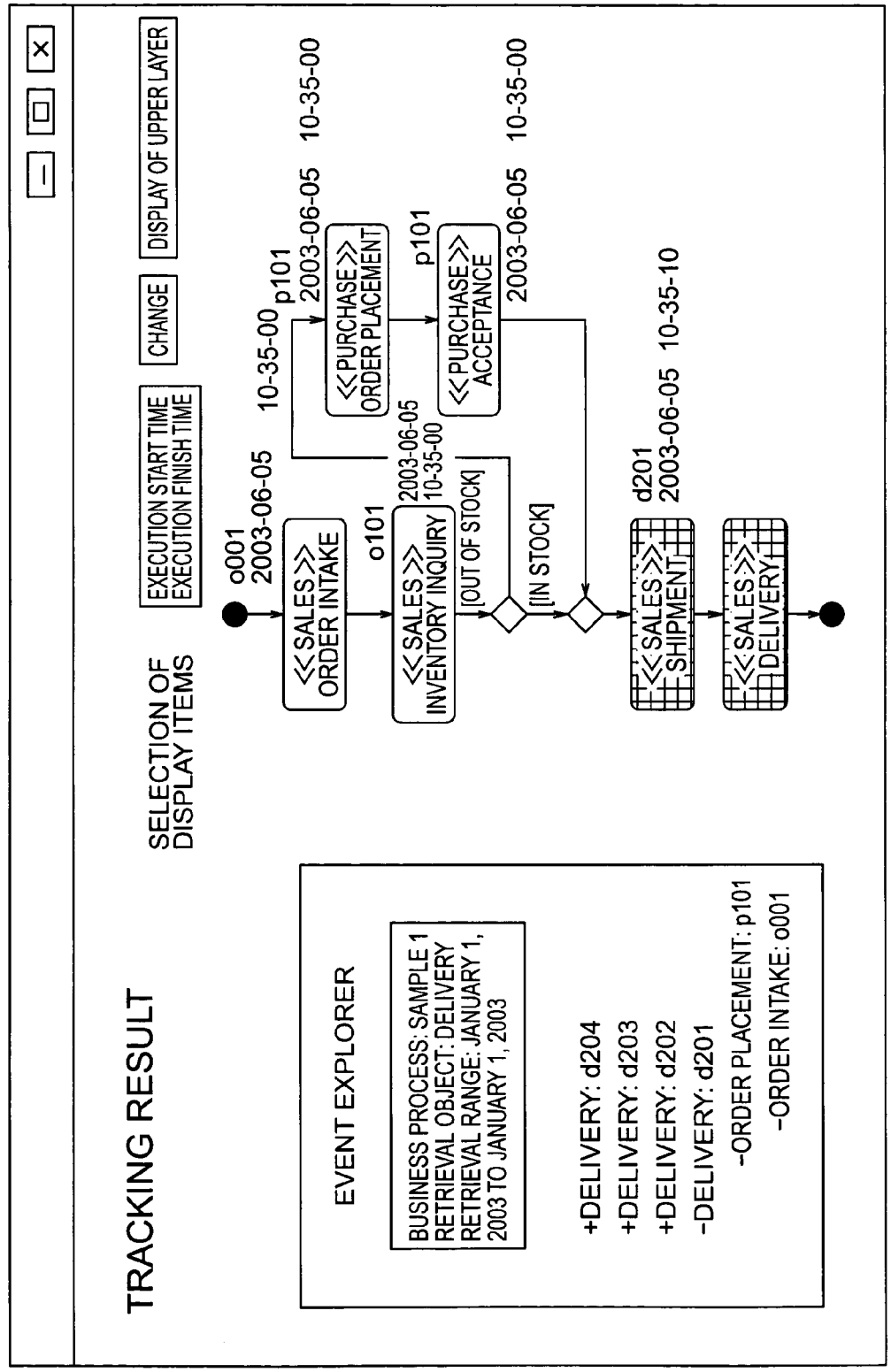
FIG. 33 shows an exemplary tracking result screen of a business process.

FIG. 33 shows an exemplary tracking result screen of a business process. Here, the retrieval result and the business process displayed are shown on a retrieval condition input screen, when "sample1" is selected as a business process, "delivery" as a retrieval object, and "Jan. 1, 2003 to Oct. 1, 2003" as a retrieval range.

As shown in a display area of Event Explorer in FIG. 33, since "delivery: d201" which is a primary data item of a delivery slip is selected, the event of "shipment" and the event of "delivery" which are relative to the delivery slip are retrieved. In consequence of tracking the business process, the activities relative to these events of "shipment" and "delivery" are changed for color and displayed as shown by double hatching.

Figure 34:
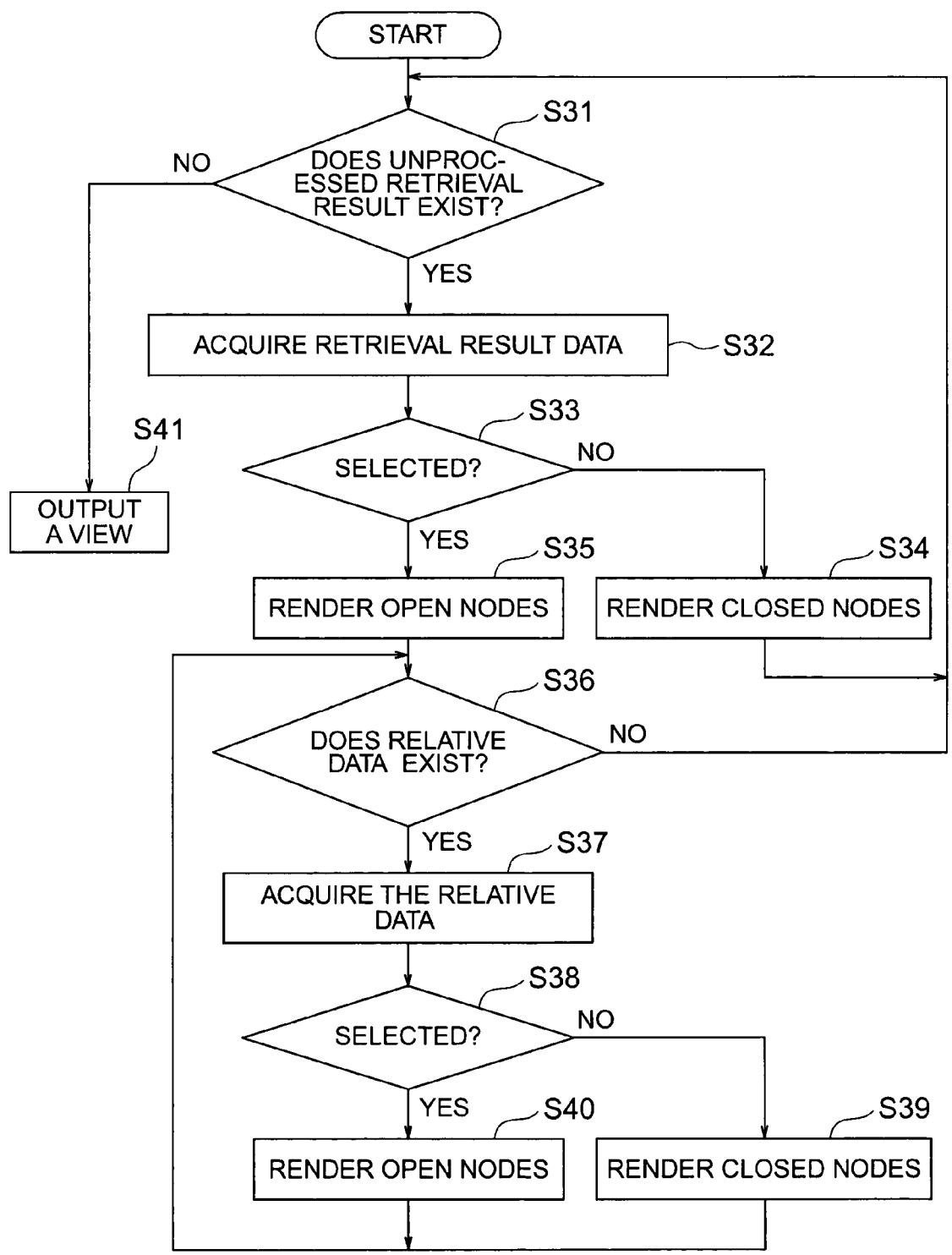
FIG. 34 is a chart showing the display processing flow of Event Explorer.

FIG. 34 is a chart showing the display processing flow of Event Explorer. First, it is determined whether an unprocessed retrieval result exists (step S31). When the unprocessed retrieval result exists, retrieval result data is acquired (or collected) on the basis of the retrieval conditions inputted from the user terminal 6 (step S32). For example, in Event Explorer displayed in PART A of FIG. 31, "order intake: o001" is acquired as retrieval result data.

Next, it is determined whether the acquired retrieval result data is selected (step S33). When the retrieval result data is not selected, a close node is rendered (step S34), and then the process returns to step S31. For example, rendering is performed as shown in "+ order intake: o001" shown in PART A of FIG. 31 mentioned above.

When the retrieval data is selected, an open node is rendered (step S35). For example, rendering is performed as "– order intake: o001" shown in PART B of FIG. 31. Next, it is determined whether relative data exists (step S36), and when relative data does not exist, the process returns to step S31. When the relative data exists, the relative data is acquired (step S37). Next, it is determined whether relative data is selected (step S38). When the relative data is not selected, a close node is rendered (step S39), and then, the process returns to step S36. For example, in PART B of FIG. 31, "delivery: d001" acquired as the relative data of "order intake: o001" selected is rendered like "+ delivery: d001."

When the retrieval data is selected, an open node is rendered (step S40). For example, rendering is performed as "– delivery: d001" shown in PART C of FIG. 31. When no unprocessed retrieval result is left, an edited view (the whole screen) is outputted (step S41), and then the processing is ended.

Figure 35:
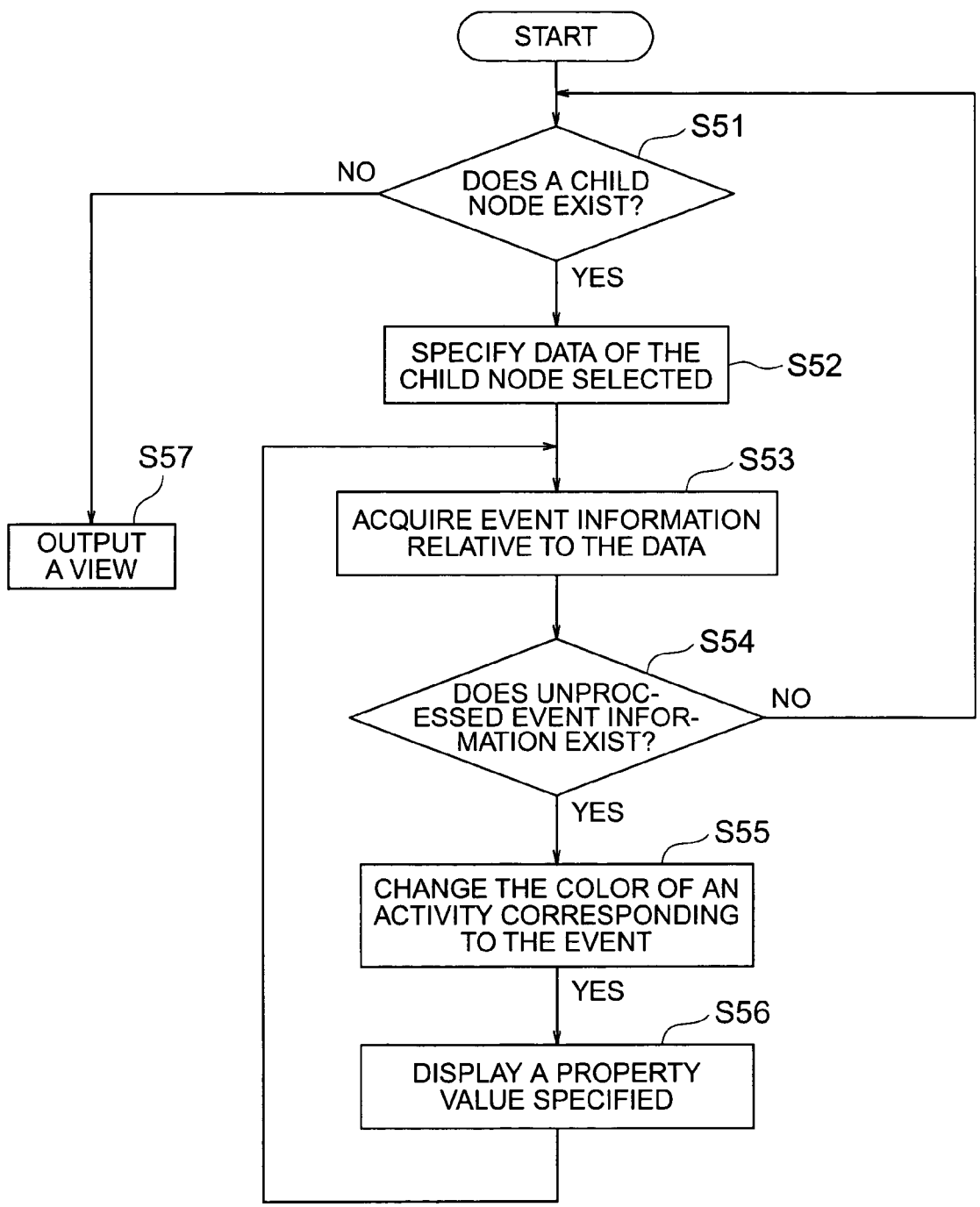
FIG. 35 is a chart showing the tracking display processing flow of a business process.

FIG. 35 is a chart showing the tracking display processing flow of a business process. First, it is determined whether a selected child node exists (step S51). For example, it is determined whether data with "–" exists in Event Explorer displayed on FIG. 33. In the display example in Event Explorer shown in FIG. 33, it turns out that "delivery: d201" has been selected. Next, data of the selected child node is specified (step S52), and then event information relative to the specified data is acquired (step S53). For example, the event information of "shipment" and the event information of "delivery" which are relative to "delivery: d201" selected are acquired.

Next, it is determined whether unprocessed event information exists (step S54). When unprocessed event information exists, the color of activities corresponding to the event is changed (step S55). For example, in the business process shown in FIG. 33, the color of the activities relative to the event "shipment" and "delivery" is changed as shown by double hatching. Then, the specified property value is displayed (step S56), and then the process returns to step S53. When unprocessed event information does not exist at step S54, the process returns to step S51. And, when the selected child node does not exist, a view output is performed (step S57), and then the processing is ended.

Figure 36:
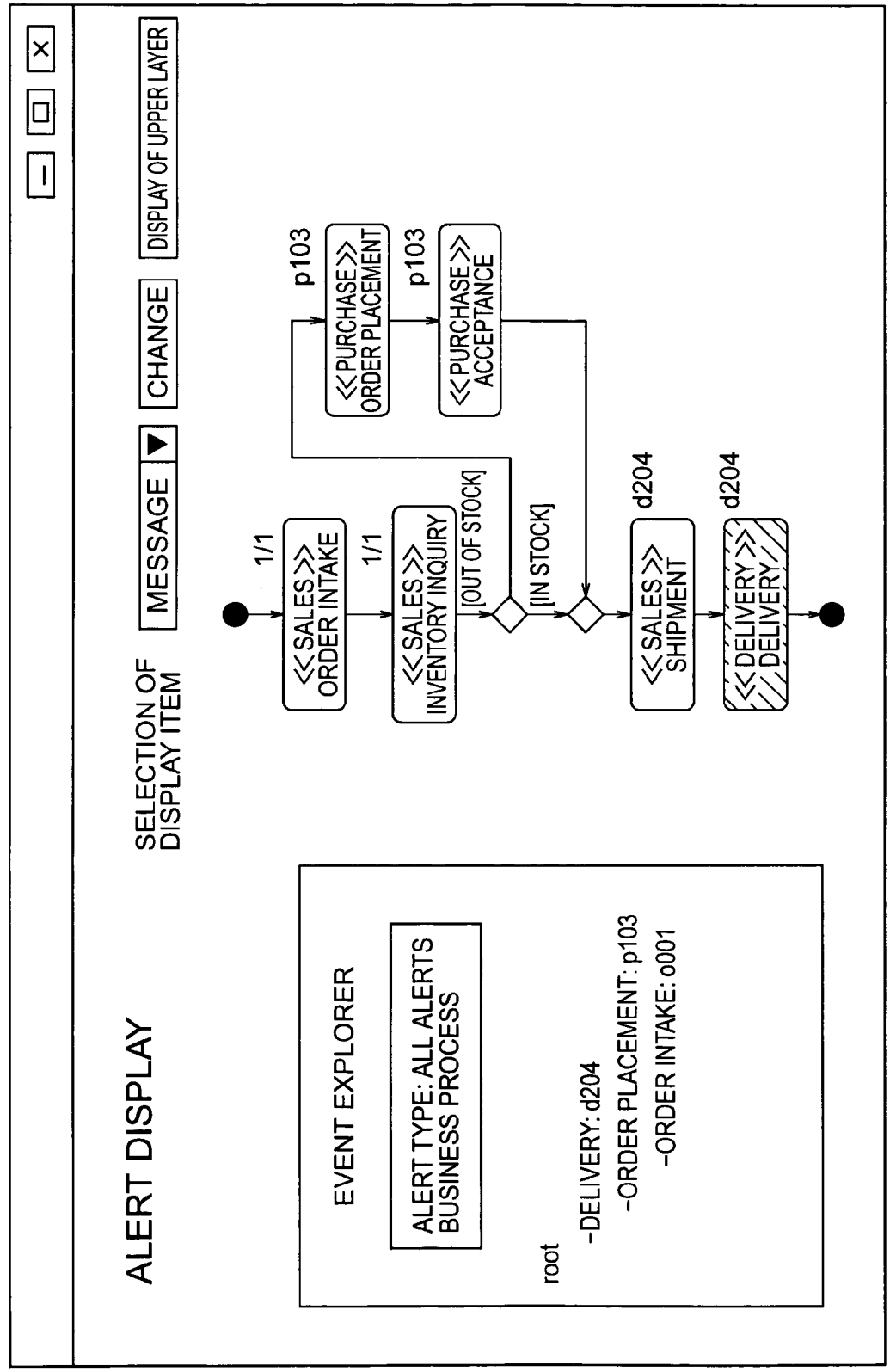
FIG. 36 shows an exemplary alert display screen.
Figure 37:
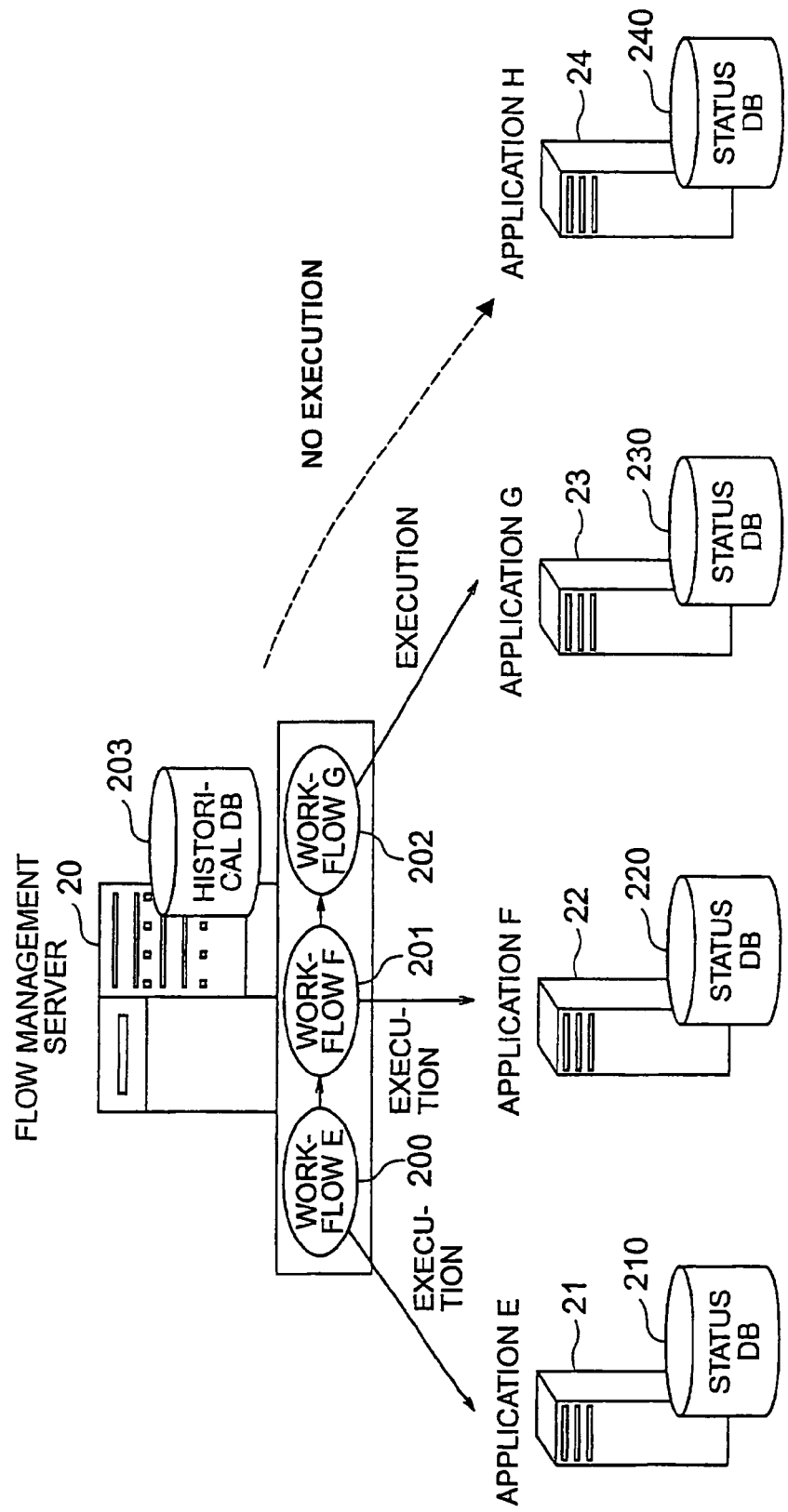
FIG. 37 is a diagram showing the outline of a conventional common workflow system.

FIG. 36 is an exemplary alert display screen. The output unit 16 of the event management apparatus 1 outputs alert display by selectively inputting a business process, which serves as an object which is given alert display, and an alert type from a user terminal 6.

In the example shown in FIG. 36, when all the alerts a reselected as the alert type and "sample1" is specified as the business process, as shown by hatching, the alert display (for example, a change of color) which notifies that "delivery" is in delivery delay among activities is given. The condition for performing the alert display can be defined beforehand when business process definition information is registered in the business process DB 15. That is, it is possible to illustrate a delay degree to the standard processing time and forecast time until a specific event is completed, by defining beforehand the standard processing time of business data as each event.

For example, based on the forecast time of event completion calculated on the basis of the defined standard processing time, it is also possible to display a slip, which is expected to be delayed, on the business process chart, and to notify a responsible person of the slip of expectation by means of e-mail or others. Thus, according to the present invention, since the event information in all the business systems A to C or 3 to 5 is related and stored in the event management DB 14, it is easy to perform the alert display by monitoring the data of the event management DB 14, if necessary.

As explained above, according to the present invention, it is possible in business process tracking to track the flow of a business process which comprises a plurality of applications executed with spreading across different business systems, without converting the existing system. In particular, according to the present invention, it is possible to grasp the status of each application, and also to grasp the status of an application which is free from flow management. In addition, according to the present invention, it is possible to grasp the relation between applications which branch to a plurality of paths.

What is claimed is:

1. A business process tracking apparatus for tracking a business process which is a flow of a plurality of businesses that are executed in a plurality of business systems, the apparatus comprising:

means for storing a plurality of business data used in the plurality of business systems and business process definition information defining a relation between the plurality of business data by using relative properties;

event data collection means for collecting event data from the plurality of business systems, the event data extracted in the plurality of business systems comprising the relative properties and information showing an execution status of each of a plurality of applications, the plurality of applications executing the plurality of businesses;

event relation means for grouping the collected event data having relative properties in common based upon the stored business process definition information and the relative properties included in the collected event data from the plurality of business systems, and relating the grouped event data among the plurality of business systems based upon the plurality of business data;

event management data storage means for storing the related event data; and output means for outputting the related event data in a tree form by retrieving the event data from the event management data storage means based upon input retrieval conditions.

2. The business process tracking apparatus according to claim 1, wherein the output means comprises means for displaying an event relative to business data selected on the outputted event data in the tree form on a business process chart produced on the basis of the business process definition information.

3. The business process tracking apparatus according to claim 2,
wherein the business process definition information includes definition information of standard processing time of each business data as an event, and
wherein the output means calculates and displays a delay degree to standard processing time or forecast time until processing of the event is ended when displaying the event.

4. The business process tracking apparatus according to claim 1, wherein each of the business systems further comprises:
memory means for storing event extraction definition information which defines event information to be extracted in the each of the business system on the basis of the business process definition information; and
event extraction means for extracting event data on the basis of the event extraction definition information defined beforehand.

5. The business process tracking apparatus according to claim 1, wherein each of the business systems further comprises:
event data conversion means for converting event data which is extracted by the event extraction means into data which is expressed in markup language common to the each of the business system.

6. The business process tracking apparatus according to claim 1, wherein said event data collection means collects data in an event queue.

7. A business process tracking method for tracking a business process which is a flow of a plurality of businesses that are executed in a plurality of business systems, the method comprising:
storing a plurality of business data used in the plurality of business systems and business process definition information defining a relation between the plurality of business data by using relative properties;
collecting event data from the plurality of business systems, the event data extracted in the plurality of business systems comprising the relative properties and information showing an execution status of each of a plurality of applications, the plurality of applications executing the plurality of businesses;
grouping the collected event data having relative properties in common based upon the stored business process definition information and the relative properties included in the collected event data from the plurality of business systems, and relating the grouped event data among the plurality of business systems based upon the plurality of business data;
storing the related event data in a data storage; and
outputting the related event data in a tree form by retrieving the event data from the data storage based upon input retrieval conditions.

8. The business process tracking method according to claim 7, wherein said event data is collected in an event queue.

9. A computer readable recording medium recording a program for tracking a business process which is a flow of a plurality of businesses that are executed in a plurality of business systems, wherein the program causes a computer to execute:
storing a plurality of business data used in the plurality of business systems and business process definition information defining a relation between the plurality of business data by using relative properties;
collecting event data from the plurality of business systems, the event data extracted in the plurality of business systems comprising the relative properties and information showing an execution status of each of a plurality of applications, the plurality of applications executing the plurality of businesses;
grouping the collected event data having relative properties in common based upon the stored business process definition information and the relative properties included in the collected event data from the plurality of business systems, and relating the grouped event data among the plurality of business systems based upon the plurality of business data;
storing the related event data in a data storage; and
outputting the related event data in a tree form by retrieving the event data from the data storage based upon input retrieval conditions.

10. The compurter readable recording medium according to claim 9, wherein said event data is collected in an event queue.

* * * * *

UNITED STATES PATENT AND TRADEMARK OFFICE
CERTIFICATE OF CORRECTION

PATENT NO.       : 7,487,163 B2
APPLICATION NO.  : 10/823562
DATED            : February 3, 2009
INVENTOR(S)      : Yoshihide Nomura et al.

Page 1 of 1

It is certified that error appears in the above-identified patent and that said Letters Patent is hereby corrected as shown below:

Column 18, Line 41, change "compurter" to --computer--.

Signed and Sealed this

Second Day of June, 2009

JOHN DOLL
*Acting Director of the United States Patent and Trademark Office*